United States Patent
Matsumoto

(10) Patent No.: US 8,879,822 B2
(45) Date of Patent: Nov. 4, 2014

(54) ROBOT CONTROL SYSTEM, ROBOT SYSTEM AND PROGRAM

(75) Inventor: Shigeyuki Matsumoto, Shiojiri (JP)

(73) Assignee: Seiko Epson Corporation (JP)

( * ) Notice: Subject to any disclaimer, the term of this patent is extended or adjusted under 35 U.S.C. 154(b) by 157 days.

(21) Appl. No.: 13/471,760

(22) Filed: May 15, 2012

(65) Prior Publication Data

US 2012/0294509 A1 Nov. 22, 2012

(30) Foreign Application Priority Data

May 16, 2011 (JP) ................................. 2011-109079
Dec. 6, 2011 (JP) ................................. 2011-266540

(51) Int. Cl.
*G06K 9/62* (2006.01)
*B25J 9/16* (2006.01)
*B25J 5/00* (2006.01)

(52) U.S. Cl.
CPC ..... *B25J 9/1697* (2013.01); *G05B 2219/39391* (2013.01); *G05B 2219/39393* (2013.01); *B25J 5/007* (2013.01)
USPC .......................................................... 382/153

(58) Field of Classification Search
CPC .................................................... G06T 1/0014
See application file for complete search history.

(56) References Cited

U.S. PATENT DOCUMENTS

| 4,613,942 A * | 9/1986 | Chen .............................. 700/259 |
| 2009/0018699 A1* | 1/2009 | Akami et al. ................. 700/259 |
| 2013/0066335 A1* | 3/2013 | Barwinkel et al. ............ 606/130 |

OTHER PUBLICATIONS

Koichi Hashimoto "Visual Servoing—V—Feature-Based Visual Servoing" vol. 54, No. 5, pp. 206-213 (2010) (with English Translation).
S. Benhimane & E. Malis "Homography-based 2D Visual Tracking and Servoing", The International Journal of Robotics Search, pp. 661-676 (Jul. 2007).

* cited by examiner

*Primary Examiner* — Brian P Werner
(74) *Attorney, Agent, or Firm* — Harness, Dickey & Pierce, P.L.C.

(57) ABSTRACT

A robot control system includes a processing unit which performs visual servoing based on a reference image and a picked-up image, a robot control unit which controls a robot based on a control signal, and a storage unit which stores the reference image and a marker. The storage unit stores, as the reference image, a reference image with marker in which the marker is set in an area of a workpiece or a hand of the robot. The processing unit generates, based on the picked-up image, a picked-up image with marker in which the marker is set in an area of the workpiece or the hand of the robot, performs visual servoing based on the reference image with marker and the picked-up image with marker, generates the control signal, and outputs the control signal to the robot control unit.

17 Claims, 15 Drawing Sheets

ROBOT CONTROL SYSTEM, ROBOT SYSTEM AND PROGRAM

BACKGROUND

1. Technical Field

The present invention relates to a robot control system, a robot system and a program or the like.

2. Related Art

Recently, industrial robots are increasingly introduced at production sites in order to mechanize and automate works which are previously carried out by humans. However, accurate calibration is a prerequisite for positioning robots and this creates a barrier to the introduction of robots.

Now, visual servoing is used as a technique for positioning a robot. Visual servoing is a technique of controlling a robot based on the difference between a reference image (goal image, target image) and a picked-up image (present image). A type of visual servoing is advantageous in that accuracy in calibration is not required and therefore draws attention as a technique that reduces the barrier to the introduction of robots.

Meanwhile, visual servoing has a downside that a robot cannot be controlled unless the robot stands within a range that can be captured by a camera.

Therefore, in order to control a robot in a range that cannot be captured by one camera, techniques such as arranging plural cameras and providing a reference image for each camera to perform visual servoing are conceivable.

As a technique for such visual servoing, a related art is described in Koichi Hashimoto, "Visual Servoing V—Feature-Based Visual Servoing," Systems, Control and Information, Vol. 54, No. 5, pp. 206-213, 2010.

In visual servoing, depending on the image used, image processing may not finish within an estimated period of time and sending of a control signal may be delayed, and when a robot is at a predetermined distance or farther from a target position, image processing may fail and result in inability to generate an effective control signal.

Moreover, when the use of a multipurpose robot capable of handling various kinds of works is assumed, it is difficult to prepare necessary reference images corresponding to all combinations of different workpieces and tools.

SUMMARY

An advantage of some aspects of the invention is to provide a robot control system, a robot system and a program or the like which can perform visual servoing using an image with a marker set thereon.

Another advantage of some aspects of the invention is to provide a robot control system, a robot system and a program or the like in which a marker and a mask image are set on a workpiece and a hand or the like and visual servoing is performed using these images, thus restraining the cost of preparing reference images and also restraining the processing load in order to enable calculation of an effective control signal even when the workpiece is at a predetermined distance or farther from the hand.

An aspect of the invention relates to a robot control system including: a processing unit which performs visual servoing based on a reference image that is an image representing a target state of a robot and a picked-up image that is an image of the robot picked up by an image pickup unit; a robot control unit which controls the robot based on a control signal for the robot outputted from the processing unit; and a storage unit which stores information of the reference image and a marker for visual servoing. The storage unit stores, as the reference image, a reference image with marker in which at least one unit of the marker is set in an area of at least one of a workpiece and a hand of the robot. The processing unit generates, based on the picked-up image, a picked-up image with marker in which at least one unit of the marker is set in an area of at least one of the workpiece and the hand of the robot appearing in the picked-up image, performs visual servoing based on the reference image with marker and the picked-up image with marker, generates the control signal, and outputs the control signal to the robot control unit. Another aspect of the invention relates to a program causes computer to function as each of the above units, or a computer-readable information storage medium storing the program.

According to the aspect of the invention, a reference image with marker in which at least one marker is set in an area of at least one of the workpiece and the hand of the robot is stored as a reference image. Moreover, a picked-up image with marker in which at least one marker is set in an area of at least one of the workpiece and the hand of the robot appearing in the picked-up image is generated based on the picked-up image. Thus, visual servoing can be carried out based on the reference image with marker and the picked-up image with marker.

According to one aspect of the invention, the storage unit may store a mask image and store, as the reference image, a reference image with marker and mask in which the mask image is set in an area of at least one of the workpiece and the hand of the robot, with at least one unit of the marker set on the mask image. The processing unit may generate, based on the picked-up image, a picked-up image with marker and mask in which the mask image is set in the area of at least one of the workpiece and the hand of the robot appearing in the picked-up image, with at least one unit of the marker set on the mask image, perform visual servoing based on the reference image with marker and mask and the picked-up image with marker and mask, generate the control signal, and output the control signal to the robot control unit.

Therefore, visual servoing or the like can be carried out based on the reference image with marker and mask and the picked-up image with marker and mask. Thus, the use of the mask image enables the cost of preparing the reference image to be restrained, and the use of the marker enables facilitation of homography computations or the like and calculation of the quantity of features of images, and the like.

According to one aspect of the invention, the processing unit may perform visual servoing based on the reference image with marker and mask and the picked-up image with marker and mask, generate the control signal and output the control signal to the robot control unit, when a difference between a position of an end point of an arm of the robot and the target position is determined as equal to or greater than a first threshold value.

Therefore, when the difference between the position of the endpoint of the arm of the robot and the target position is determined as equal to or greater than the first threshold value, visual servoing or the like can be performed based on the reference image with marker and mask and the picked-up image with marker and mask. Thus, when processing with a large processing volume such as greatly moving the position of each part of the robot is carried out, restraining the processing load on robot control system or the like is possible.

According to one aspect of the invention, the processing unit may output, to the robot control unit, the control signal for shifting the end point of the arm to a predetermined position, when the difference between the position of the endpoint of the arm of the robot and the target position is determined as equal to or greater than the first threshold value. The robot control unit may control the robot based on the control signal and shift the end point of the arm of the robot to the predetermined position. When the robot is determined as situated at the predetermined position, the processing unit may perform visual servoing based on the reference image with marker and mask and the picked-up image with marker and mask, generate the control signal, and output the control signal to the robot control unit.

Therefore, when the difference between the position of the endpoint of the arm of the robot and the target position is determined as equal to or greater than the first threshold value, visual servoing or the like can be carried out based on the reference image with marker and mask and the picked-up image with marker and mask, after the end point of the arm of the robot is shifted to the predetermined position. Thus, the number of times of visual servoing being performed can be reduced and restraining the processing load on the robot control system or the like is possible.

According to one aspect of the invention, the storage unit may store, as the reference image, a reference image without mask in which the mask image is not set and the reference image with marker. The processing unit may perform visual servoing based on a picked-up image without mask that is the picked-up image on which the mask image is not set and the reference image without mask, generate the control signal and output the control signal to the robot control unit, when a difference between an end point of an arm of the robot and the target position is determined as equal to or smaller than a second threshold value.

Therefore, when the difference between the position of the end point of the arm of the robot and the target position is determined as equal to or smaller than the second threshold value, visual servoing or the like can be carried out based on the picked-up image without mask and the reference image without mask. Thus, when highly accurate control is required as in fine-tuning the position of each part of the robot, highly accurate visual servoing or the like can be carried out.

According to one aspect of the invention, the storage unit may store a mask image and a reference image without mask that is the reference image on which the mask image is not set, and may store, as the reference image, a reference image with marker and mask in which the mask image is set in the area of at least one of the workpiece and the hand of the robot, with at least one unit of the marker set on the mask image. When the processing unit performs visual servoing based on a picked-up image without mask that is the picked-up image on which the mask image is not set and the reference image without mask, and cannot decide the control signal, the processing unit may generate a picked-up image with marker and mask that is the picked-up image in which the mask image is set in the area of at least one of the workpiece and the hand of the robot appearing in the picked-up image, with at least one unit of the marker set on the mask image, perform visual servoing based on the reference image with marker and mask and the picked-up image with marker and mask, generate the control signal and output the control signal to the robot control unit.

Therefore, when visual servoing is performed based on a picked-up image without mask and the reference image without mask and the control signal cannot be decided, visual servoing or the like can be performed based on the reference image with marker and mask and the picked-up image with marker and mask. Thus, avoiding a situation where the robot becomes uncontrollable because of the failure to decide the control signal or the like can be avoided.

According to one aspect of the invention, the processing unit may set the marker by carrying out image shape recognition processing to at least one of the workpiece and the hand of the robot.

Therefore, by carrying out image shape recognition processing to at least one of the workpiece and the hand of the robot, setting the marker or the like is possible. Thus, setting the marker or the like is possible without involving the cost of preparation in setting the marker.

According to one aspect of the invention, the storage unit may store the reference image with marker on which the marker without rotational symmetry is set. The processing unit may generate the picked-up image with marker on which the marker without rotational symmetry is set, perform visual servoing based on the reference image with marker and the picked-up image with marker, generate the control signal and output the control signal to the robot control unit.

Therefore, visual servoing or the like can be carried out based on the reference image with marker and picked-up image with marker on which the marker without rotational symmetry is set. Thus, reduction in the number of markers to be set, reduction in the cost of setting markers and the like are possible.

Still another aspect of the invention relates to a robot system including the robot control system.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment will be described. First, an example of a system configuration according to this embodiment will be described. Next, a specific example of this embodiment will be described. Afterwards, details of processing in this embodiment will be described with reference to the flowcharts. The following embodiment is not intended to unduly limit the content of the invention described in the accompanying claims. Not all the elements of the configuration described in the embodiment are necessarily essential element of the invention.

1. Example of System Configuration

1.1 Example of Configuration of Robot System

Figure 1:
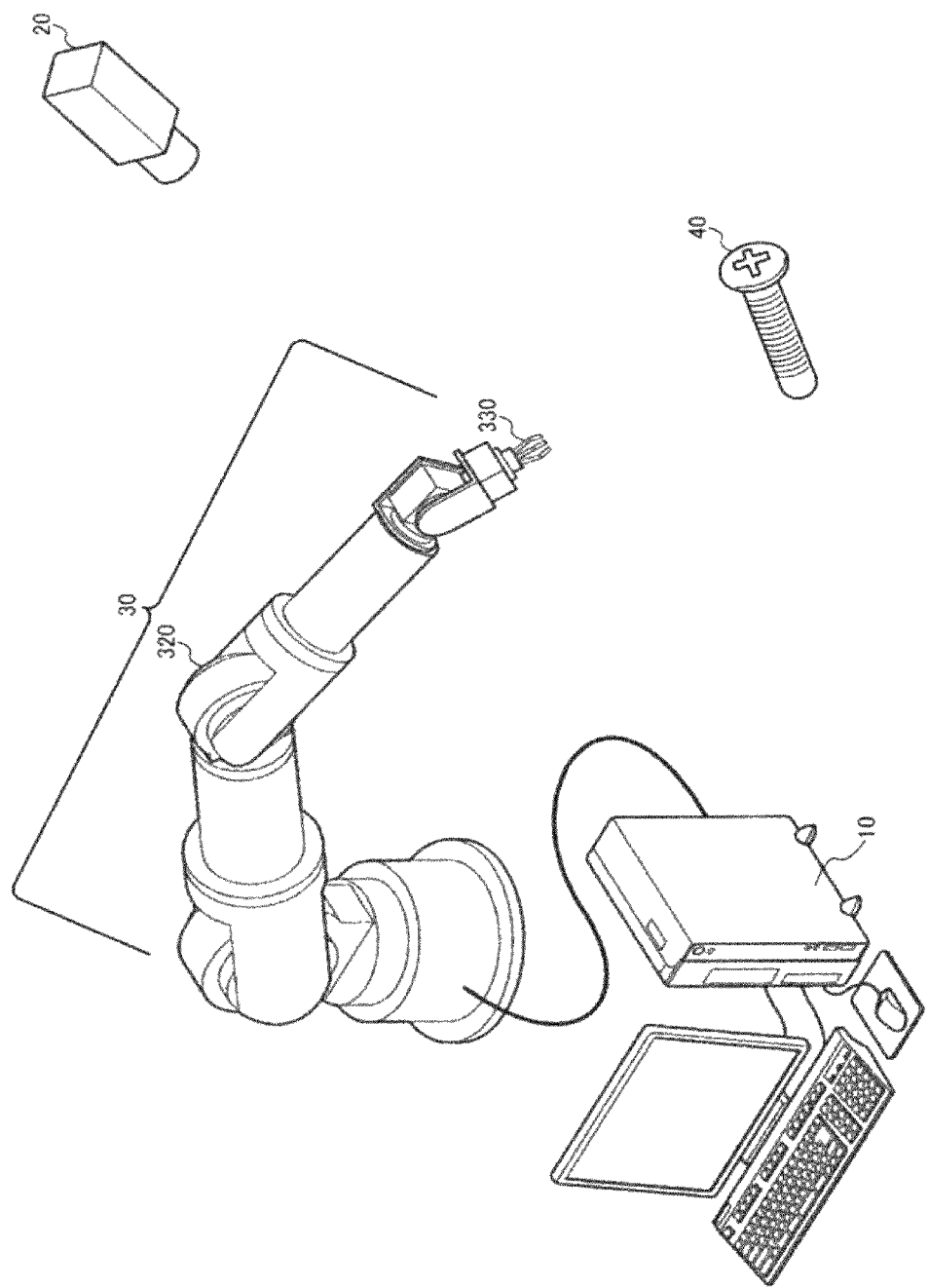
FIG. 1 shows an example of a system configuration according to an embodiment.

An example of the configuration of a robot system according to this embodiment is shown in FIG. 1. The robot system includes a robot control system 10, an image pickup unit 20, and a robot 30. However, the robot system is not limited to the configuration of FIG. 1 and various modified embodiments are possible such as omitting one or some of the components or adding another component.

The robot control system 10 generates a control signal based on an image provided from the image pickup unit 20 and controls the robot 30 based on the control signal. Details of the robot control system will be described later. A part or the whole of the functions of the robot control system 10 according to this embodiment is realized, for example, by an information processing device such as a PC. However, a part or the whole of the functions of the robot control system 10 may be realized by the image pickup unit 20 and the robot 30 or by an electronic device that is different from an information processing device. Also, a part or the whole of the functions of the robot control system 10 may be realized by a server connected to an information processing device or the image pickup unit 20 and the robot 30 via communication.

The image pickup unit (camera) 20 picks up an image of a work space. This image pickup unit 20 includes an image pickup element, for example, a CCD or the like, and an optical system. The image pickup unit 20 can also include a device (processor) used for image processing and the like. The image pickup unit 20 is arranged at a position where the image pickup unit 20 can pick up an image of a work space in which the robot 30 and a workpiece 40 can be located. For example, the image pickup unit 20 may be arranged directly above the workpiece 40 (a fixed camera) or may be mounted on an arm 320, a hand 330 or the like of the robot 30 (a movable camera). The workpiece 40 refers to an object of processing by the robot 30. As the image pickup unit 20, a single image pickup unit may pick up an image of the whole or a part of the work space, or plural image pickup units may pick up an image of the whole or a part of the work space. The image pickup unit 20 then outputs picked-up image information to the robot control system 10 or the like. Alternatively, since it suffices to be able to detect information about the position, attitude and the like of the workpiece 40 by using the image pickup unit 20, other techniques than the acquisition of a picked-up image by the image pickup unit 20, for example, three-dimension scan or the like using a laser or the like may be used. In this embodiment, the picked-up image information is assumed to be directly outputted to the robot control system 10, but is not limited to this configuration. For example, the image pickup unit 20 may be provided with a part of the processing unit of the robot control system 10. In such a case, information after image processing is performed to the picked-up image is outputted.

The robot 30 has the arm 320 and the hand 330 and carries out processing according to a control signal from the robot control system 10. The robot 30 carries out processing, such as, grasping and processing the workpiece 40.

Here, the arm 320 refers a movable area that is a part of the robot 30 and that includes at least one or more joints. An end point of the arm 320 refers to an area at a distal end part of the arm. 320 that is not connected with other areas than the hand 330 of the robot 30. The hand 330 refers to a component mounted on the end point of the arm 320 for grasping the workpiece 40 and processing the workpiece 40. The position of the end point of the arm may be the position of the hand.

1.2 Example of Configuration of Robot Control System

Figure 2:
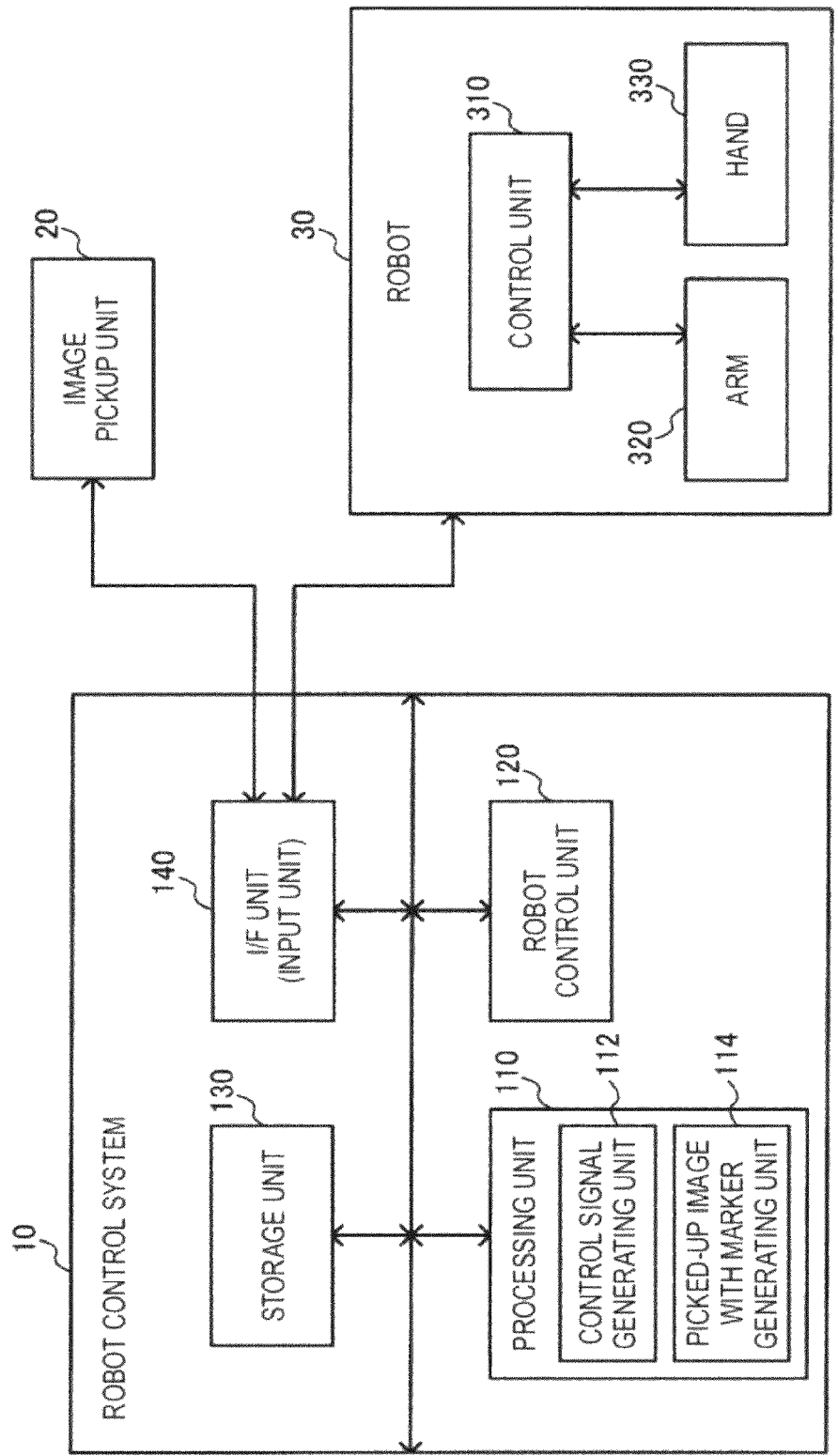
FIG. 2 shows a detailed example of the system configuration according to the embodiment.

Next, a detailed example of the configuration of the robot control system according to this embodiment and a robot system including the robot control system is shown in FIG. 2.

The robot control system 10 includes a processing unit 110, a robot control unit 120, a storage unit 130, and an interface (I/F) unit (input unit) 140. The robot control system 10 is not limited to the configuration of FIG. 2 and various modified embodiments are possible such as omitting one or some of the components or adding another component.

Next, processing carried out by each unit will be described.

The processing unit 110 carries out various kinds of processing based on data from the storage unit 130 and information and the like from image pickup unit 20 or the robot 30 received via the I/F unit 140. The functions of the processing unit 110 can be realized by hardware such as various processors (CPU or the like) or ASIC (gate array or the like), or by a program or the like.

The processing unit 110 also includes a control signal generating unit 112 and a picked-up image with marker generating unit 114. The processing unit 110 is not limited to the configuration of FIG. 2 and various modified embodiments are possible such as omitting one or some of the components or adding another component.

The control signal generating unit 112 performs visual servoing based on a reference image and a picked-up image, generates a control signal for the robot 30 and outputs the control signal to the robot control unit 120. The operations of the picked-up image with marker generating unit 114 will be described later. In this example, the control signal generating unit 112 and the picked-up image with marker generating unit 114 are provided in the processing unit 110 of the robot control system. 10, but these units are not limited to this configuration. The control signal generating unit 112 and the picked-up image with marker generating unit 114 may be provided inside the image pickup unit 20, the robot 30 or the like.

The robot control unit 120 controls the robot 30 based on the control signal outputted from the processing unit 110.

The storage unit 130 stores a database and serves as a work area for the processing unit 110 or the like. The functions of the storage unit 130 can be realized by a memory such as a RAM or by an HDD (hard disk drive) or the like.

The I/F unit 140 is an interface for entering an input or the like from the user to the robot control system 10 and for accepting information from the image pickup unit 20 and the robot 30. In terms of entering an input or the like from the user, the I/F unit 140 may include a switch, button, keyboard, mouse or the like.

As an example of a robot system including the robot control system 10, a robot system including the image pickup unit 20, the robot 30 and the like can be employed.

The image pickup unit 20 is as described above. The robot 30 includes a control unit 310 in addition to the arm 320 and the hand 330. The control unit 310 accepts information from the robot control system 10 and controls each part (arm 320, hand 330 or the like) of the robot 30.

1.3 Outline of Visual Servoing

Before explaining characteristics of this embodiment, an outline of visual servoing, a flow of position-based visual servoing and a flow of feature-based visual servoing will be described.

Visual servoing relates to a kind of servo system which measures a change in the position of a target as visual information and uses this visual information as feedback information to track the target. Visual servoing is roughly divided into two types, that is, position-based visual servoing and feature-based visual servoing, depending on input information (control quantity) to the servo system. In position-based visual servoing, position information and attitude information of an object is used as input information to the servo system. In feature-based visual servoing, a feature quantity of an image is used as input information to the servo system. There is also a position-based and feature-based hybrid technique. Visual servoing utilized in this invention relates to all these techniques.

A common feature of these visual servoing techniques is that input information to the servo system is found based on a reference image and a picked-up image. According to the invention, by setting a mask image for the reference image and picked-up image, the cost of preparing the reference image can be restrained and calculation of input information to the servo system can be facilitated.

1.3.1 Flow of Position-Based Visual Servoing

Figure 3:
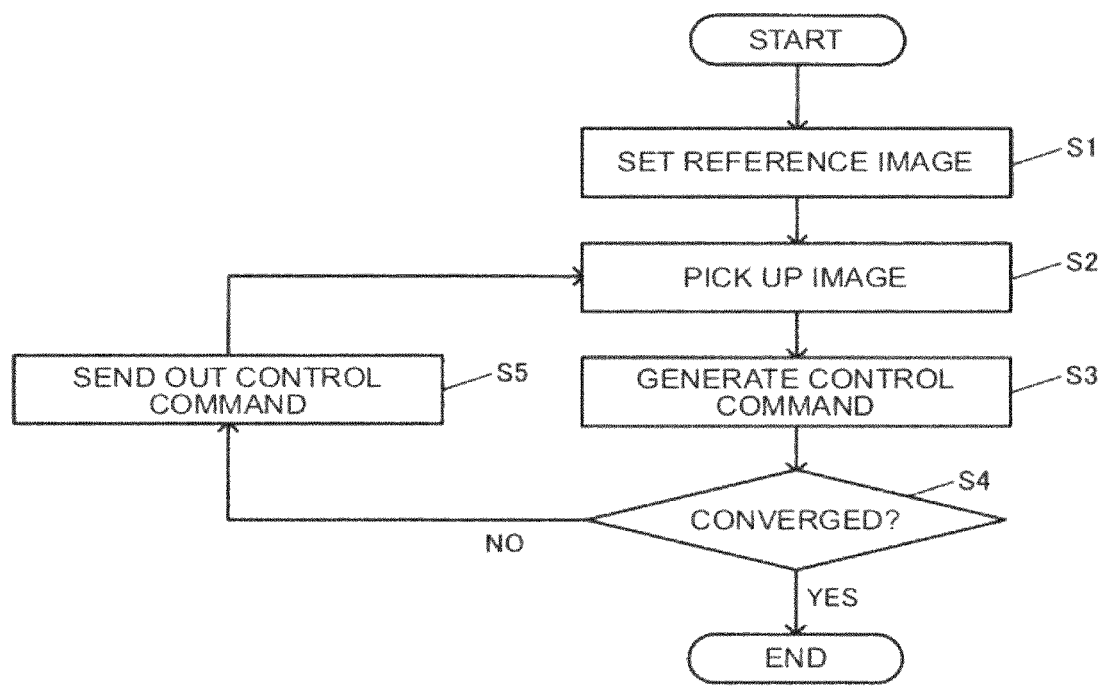
FIG. 3 is a flowchart illustrating position-based visual servoing.

First, FIG. 3 shows a flow of position-based visual servoing. In position-based visual servoing, a reference image is set first (S1). Here, the reference image is also called target image or goal image and is an image serving as a control target of visual servoing and showing a target state of the robot 30. That is, the reference image is an image showing a target position and target attitude of the robot 30 or an image showing a state where the robot 30 is situated at a target position. The reference image needs to be prepared and stored in advance in the storage unit 130.

Next, the image pickup unit 20 picks up an image of a work space and acquires a picked-up image (S2). The picked-up image is an image picked up by the image pickup unit 20. The picked-up image shows the present state of the work space. When the robot 30 and the workpiece 40 appear in the picked-up image, the picked-up image shows the present state of the robot 30 and the workpiece 40. A processing delay may occur depending on the capability of the image pickup unit 20. Here, even when there is a processing delay, the picked-up image is handled as showing the present state.

Figure 4A:
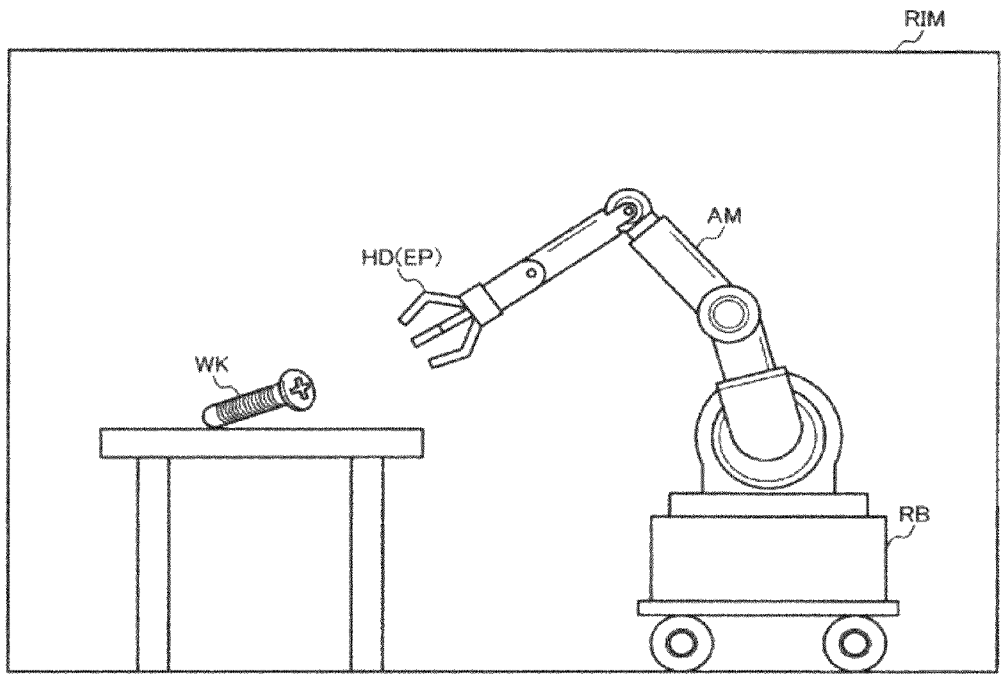
FIGS. 4A and 4B are explanatory views of a reference image and a picked-up image.
Figure 4B:
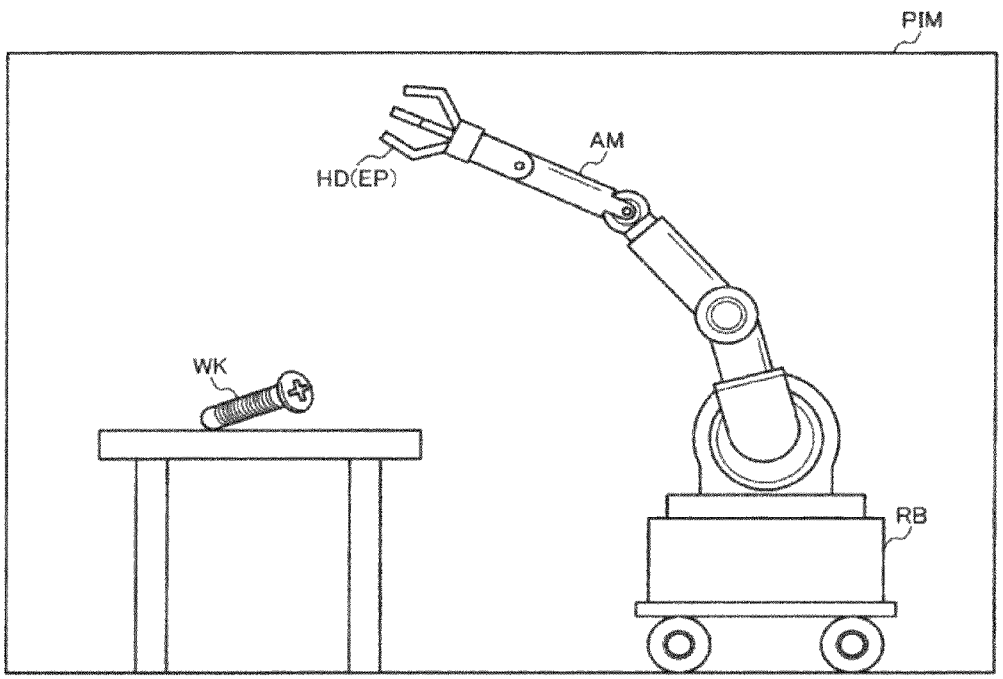

For example, FIG. 4A shows a specific example of a reference image RIM. FIG. 4B shows a specific example of a picked-up image PIM. In the picked-up image PIM, a robot RB has an arm AM and hand HD (or endpoint EP) facing upward, whereas in the reference image RIM, the robot RB is bending the arm AM and thus bringing the hand HD closer to a workpiece WK. Therefore, in this specific example, the robot RB is controlled to bend the arm AM of the robot RB and thus bring the hand HD closer to the workpiece WK.

Next, a control command is generated (S3). For example, the control command is generated by using homography or the like, which is a kind of coordinate transformation, based on a reference image and a picked-up image. In this case, a homography matrix is found and a speed command is generated as a control signal for the robot 30, based on the homography matrix.

Here, the control signal (control command) refers to a signal including information for controlling the robot 30. The speed command refers to a commanding technique for providing the moving speed and rotating speed of the endpoint or the like of the arm 320 of the robot 30, as information for controlling each part of the robot 30.

Based on the generated control signal, whether a control quantity (here the position and attitude of the robot 30) is converged to a target value or not is determined (S4). For example, when homography is used and a speed vector indicated by a speed command is 0, it can be assumed that a target state of the position and attitude as the control quantity is reached. Therefore, the control quantity is determined as converged to the target value. However, when the speed vector is not 0, the control quantity is determined as not converged to the target value.

When the control quantity is determined as converged to the target value, visual servoing ends. Meanwhile, when the control quantity is determined as not converged to the target value, the processing unit 110 sends out a control command to the robot control unit 120.

In position-based visual servoing, the above processing is repeated until the control quantity is converged to the target value.

1.3.2 Flow of Feature-Based Visual Servoing

Figure 5:
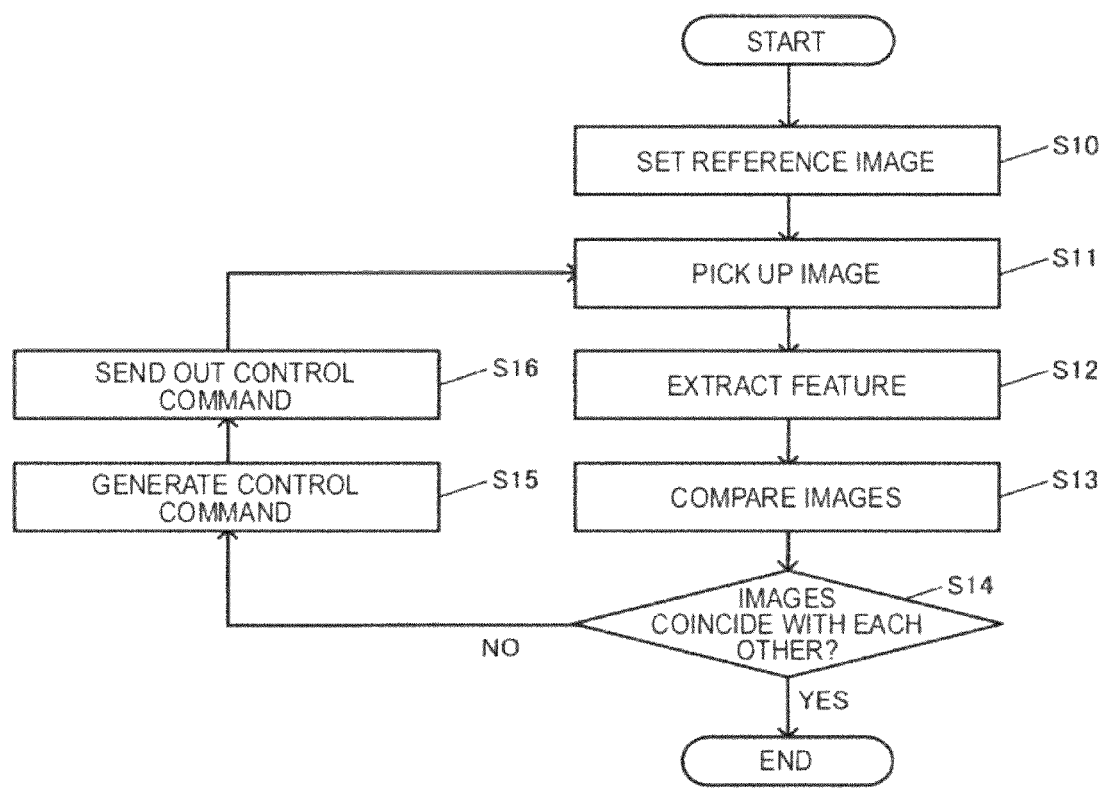
FIG. 5 is a flowchart illustrating feature-based visual servoing.

Next, FIG. 5 shows a flow of feature-based visual servoing. As in position-based visual servoing, a reference image is set first (S10). Next, the image pickup unit 20 picks up an image of a work space and acquires a picked-up image (S11). When feature-based visual servoing is used, it is desirable that a feature is extracted from the reference image and a feature quantity is calculated, when the reference image is set. Alternatively, reference image information obtained by extracting the feature of the reference image may be stored in the storage unit 130. The extraction of the feature of the image is carried out, for example, using corner detection, a Gaussian filter or the like.

Next, a feature of the picked-up image is extracted (S12). Preferably the extraction of the feature of the picked-up image is carried out in advance when the reference image is set, but may be carried out at this point. In the feature extraction, a feature quantity of the image is found as input information (control quantity) to the visual servo system. Then, based on the feature quantity of the image, the reference image and the picked-up image are compared with each other (S13) to determine whether the reference image and the picked-up image coincide with each other or not. When the images are determined as coincident with each other (S14), visual servoing ends. Meanwhile, when the images are determined as not coincident with each other (S14), a control command is generated (S15) and the control command is sent out to the robot control unit 120 (S16).

In feature-based visual servoing, the above processing is repeated until the control quantity is converged to the target value.

1.4 Technique of This Embodiment

The embodiment as described above includes the processing unit 110 which performs visual servoing based on a reference image that is an image showing a target state of the robot 30 and a picked-up image that is an image of the robot 30 picked up by the image pickup unit 20, the robot control unit 120 which controls the robot 30 based on a control signal for the robot 30 outputted from the processing unit 110, and the storage unit 130 which stores the reference image for visual servoing and information of a marker. The storage unit 130 stores, as the reference image, a reference image with marker in which at least one marker is set in an area of at least one of the workpiece 40 and the hand 330 of the robot 30. Moreover, the processing unit 110 generates, based on the picked-up image, a picked-up image with marker in which at least one marker is set in an area of at least one of the workpiece 40 and the hand 330 of the robot 30 appearing in the picked-up image, then performs visual servoing based on the reference image with marker and the picked-up image with marker, generates a control signal and outputs the control signal to the robot control unit 120.

In this embodiment, a reference image with marker in which at least one marker is set in advance in an area of at least one of the workpiece 40 and the hand 330 of the robot 30 is stored as the reference image. Moreover, based on the picked-up image, a picked-up image with marker in which at least one marker is set in an area of at least one of the workpiece 40 and the hand 330 of the robot 30 appearing in the picked-up image is generated. Thus, visual servoing can be performed based on the reference image with marker and the picked-up image with marker.

The marker (marker image) refers to an image of a letter, figure, symbol, pattern or stereoscopic shape that can be used as a mark, a combination of these, or a combination of these and color, and which is set in a partial area of the reference image or the picked-up image. The marker also includes a physical object that can be picked up in an image to generate a similar image to the above marker image and that can be fixed to an object. For example, the marker may include a seal, sticker, label or the like. The shape, color, pattern or the like of the marker is not particularly limited. However, an image, seal or the like that is easy to be distinguished from the other areas, for example, an image, seal or the like in a single color of red, is desirable.

The information of the marker may be image data or letter data used as the marker, information used to generate the marker, or information including these data. Moreover, such information of the marker may be data that is temporarily stored when reading the data from an external storage device or the like.

Figure 6A:
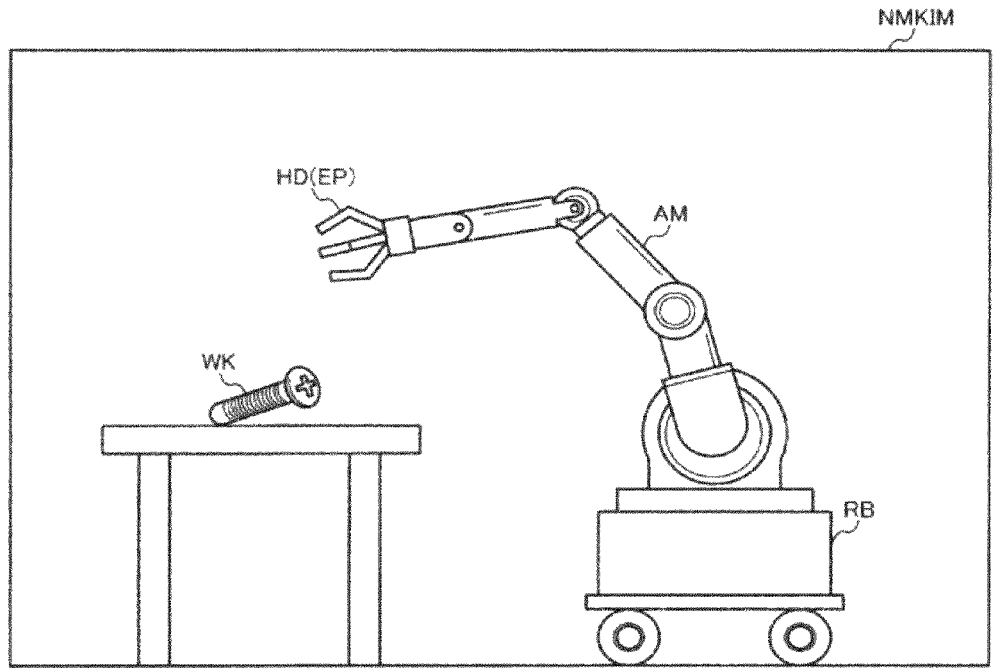
FIGS. 6A and 6B are explanatory views of markers.
Figure 6B:
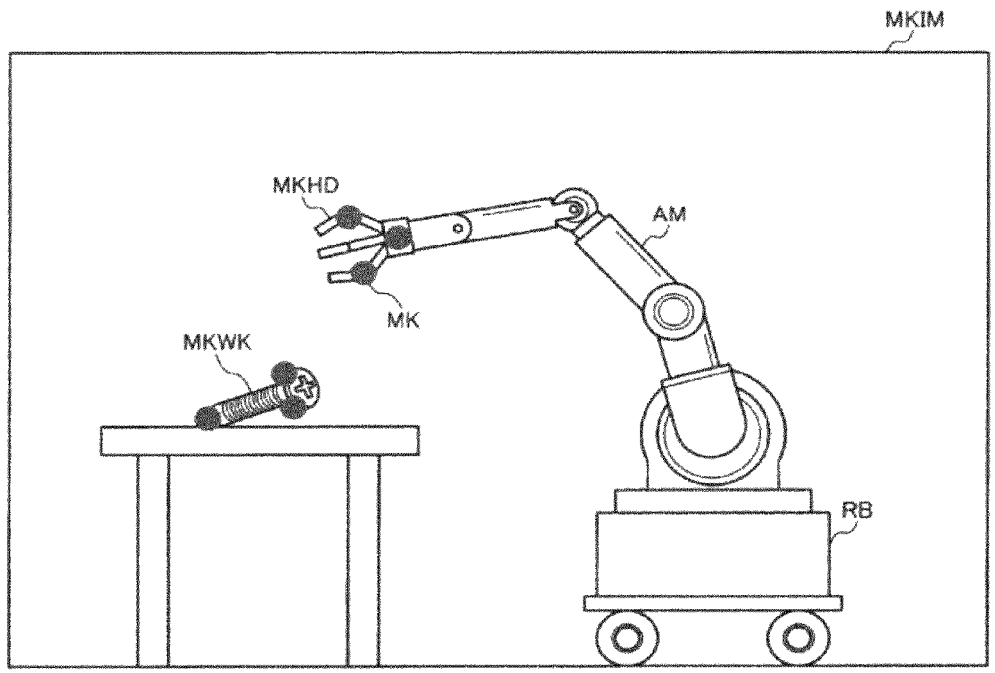

As a specific example, FIG. 6A shows an image NMKIM that is a picked-up image of a work space, with no markers MK set therein. FIG. 6B shows an image MKIM that is a picked-up image of the work space, with markers MK set therein. In this example, in FIG. 6B, the three grey circular areas on each of the hand and the workpiece are markers MK. As the markers MK are set on the hand and workpiece, the hand and the workpiece are shown as a hand MKHD and a workpiece MKWK.

Setting markers refers to replacing arbitrary areas appearing in a created image with markers when the image is generated. Possible techniques for replacing arbitrary areas of the image with markers may be, for example, superimposing marker images on the generated image, cutting out arbitrary areas from the image and inserting marker images, or attaching seals or the like used as markers to the workpiece and the hand and then picking up an image thereof. However, possible techniques for replacing arbitrary areas of the image with markers are not limited to these techniques.

When markers are set on the areas of the workpiece and the hand, a part of the markers may be protruding from the areas of the workpiece and the hand. Moreover, as the areas of the workpiece and the hand, ranges with a predetermined area may be defined as the areas of the workpiece and the hand as well as the portions where the workpiece and the hand actually appear in the image.

Moreover, the reference image with marker refers to an image showing a target state of the robot 30, with a marker set in the area of at least one of the workpiece 40 and the hand 330 of the robot 30. For example, the reference image with marker is a reference image like MKIM shown in FIG. 6B.

The picked-up image with marker refers to a picked-up image of the robot 30 by the image pickup unit 20, with a marker set in the area of at least one of the workpiece 40 and the hand 330 of the robot 30. For example, the picked-up image with marker is a picked-up image like MKIM shown in FIG. 6B.

The picked-up image with marker is generated by the picked-up image with marker generating unit 114 included in the processing unit 110.

Since visual servoing can be performed based on the reference image with marker and the picked-up image with marker, as described above, calculation of a homography matrix or the like becomes easier in the case of position-based visual servoing, and extraction of a feature quantity becomes easier in the case of feature-based visual servoing. Thus, the processing amount in calculating a control signal can be reduced, and an effective control signal can be calculated even when the workpiece and the hand are at a predetermined distance or farther from each other.

The storage unit 130 may store a mask image and may also store, as the reference image, a reference image with marker and mask in which a mask image is set in the area of at least one of the workpiece 40 and the hand 330 of the robot 30, with at least one marker set on the mask image. The processing unit 110 may generate, based on the picked-up image, a picked-up image with marker and mask in which a mask image is set in the area of at least one of the workpiece 40 and the hand 330 of the robot 30 appearing in the picked-up image, with at least one marker set on the mask image, perform visual servoing based on the reference image with marker and mask and the picked-up image with marker and mask, generate a control signal and output the control signal to the robot control unit 120.

Thus, visual servoing or the like can be carried out based on the reference image with marker and mask and the picked-up image with marker and mask.

Here, the mask image is an image that is set for covering a partial area of the work space. In this embodiment, the mask image is an image that is set for the area of at least one of the workpiece 40 and the hand 330 in the work space. The type of the mask image itself is not particularly limited, but an image that is easy to be distinguished from the other areas, for example, an image or the like in a single color of black, is desirable.

Figure 7A:
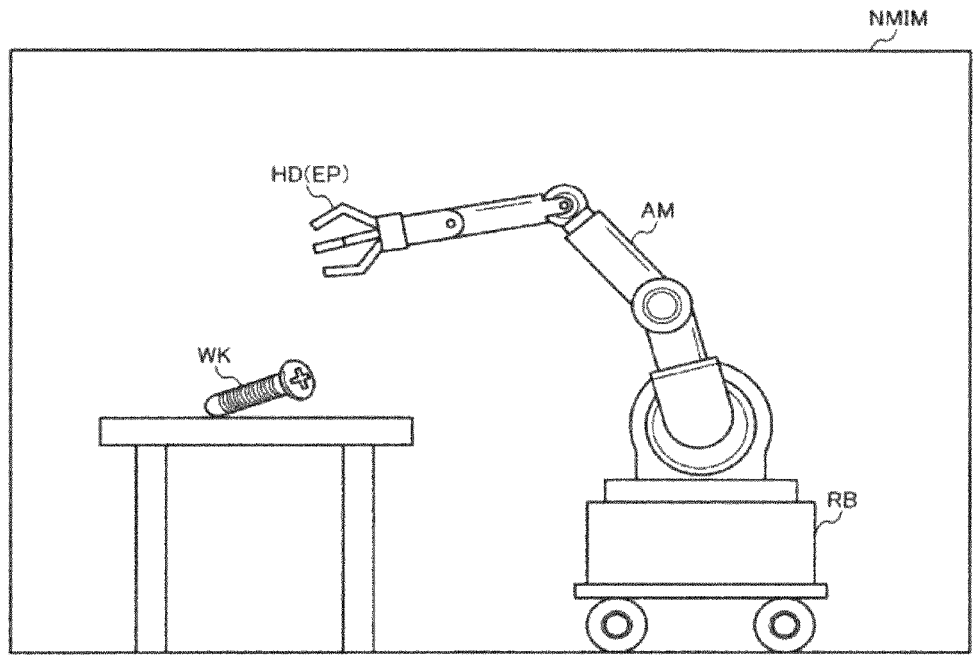
FIGS. 7A and 7B are explanatory views of mask images.
Figure 7B:
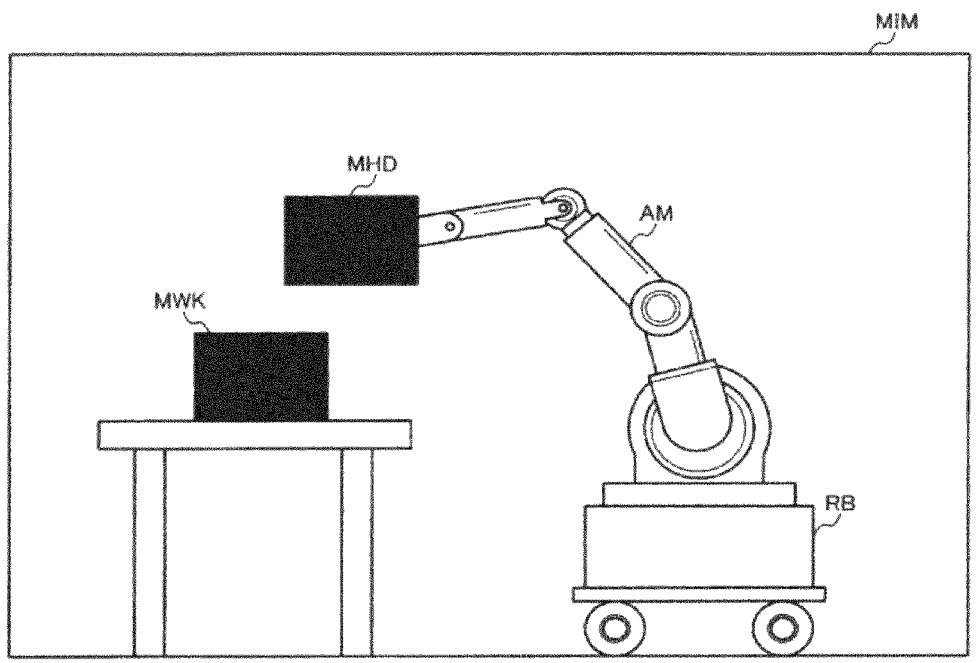

FIG. 7A shows an image NMIM that is a picked-up image of the work space, with no mask image set therein. FIG. 7B shows an image MIM that is a picked-up image of the work space, with mask images set therein. The areas where the hand HD of the robot RB and the workpiece WK appear in FIG. 7A are replaced with areas MHD and MWK in FIG. 7B. In this example, the areas in the single color of black covering the hand HD and the workpiece WK in FIG. 7B are mask images. As the mask images area set in the areas of the hand HD and the workpiece WK, the areas MHD and MWK are shown.

Setting a mask image refers to replacing an arbitrary area appearing in a created image with a mask image when the image is generated. Possible techniques for replacement with a mask image is not particularly limited and may include superimposing a mask image on the generated image, or cutting out an arbitrary area from the image and inserting a mask image, and the like.

The reference image with marker and mask refers to an image showing a target state of the robot 30, with a mask image set in the area of at least one of the workpiece 40 and the hand 330 of the robot 30 and with at least one marker set on the mask image. For example, the reference image with marker and mask is an image like MKMRIM shown in FIG. 9A, which is described later.

The picked-up image with marker and mask refers to a picked-up image of the robot 30 by the image pickup unit 20, with a mask image set in the area of at least one of the workpiece 40 and the hand 330 of the robot 30 and with at least one marker set on the mask image. For example, the picked-up image with marker and mask is an image like MKMPIN shown in FIG. 9B, which is described later.

Since the reference image with marker and mask is used as the reference image, as described above, in some cases, the same reference image with marker and mask can be used even when the workpiece and the hand are different. Therefore, the cost of preparing the reference image can be restrained, compared with the case where reference images for all the combinations of various kinds of workpieces and hands are prepared. Thus, the cost of preparing the reference image can be restrained by using the mask images, and computations for homography or the like and calculation of the feature quantity can be facilitated by using the markers.

When the processing unit 110 determines that the difference between the position of the end point of the arm 320 of the robot 30 and the target position is equal to or greater than a first threshold value, the processing unit 110 may perform visual servoing based on the reference image with marker and mask and the picked-up image with marker and mask, generate a control signal and output the control signal to the robot control unit 120.

Figure 10:
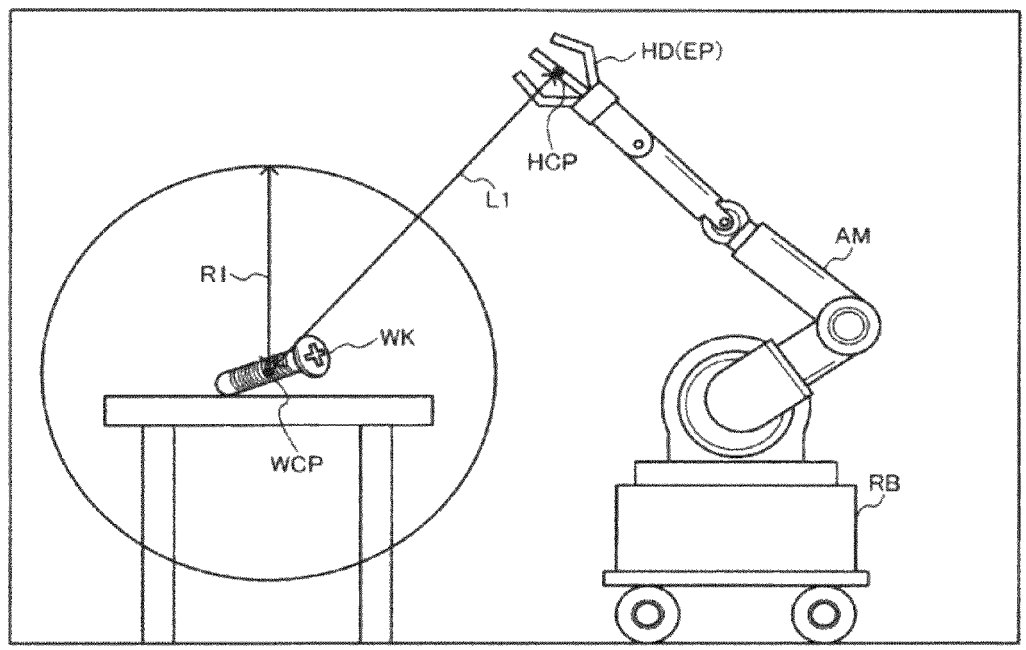
FIG. 10 is an explanatory view of a visual servoing in a case where the end point of the arm is sufficiently away from the target position.

Here, the difference between the position of the end point of the arm 320 and the target position includes not only the linear distance between the two points in a three-dimensional space but also mathematically equivalent information. An example may be the distance between the position of the endpoint of the arm 320 and the target position in a two-dimensional picked-up image. A specific example is a distance L1 between a center point WCP of the workpiece WK (target position) and a center point HCP of the hand HD in a two-dimensional image, as shown in FIG. 10, which is described later. Additionally, when only one of the position of the end point of the arm 320 and the target position appears in the picked-up image, the difference between the position of the end point of the arm 320 and the target position may be set to a predetermined value that is greater than the first threshold value.

The first threshold value is a value that serves as a reference for determining whether the position of the end point of the arm 320 and the target position are sufficiently away from each other or not. As the first threshold value, a reference value corresponding to the value used as the difference between the position of the end point of the arm 320 and the target position is set. The first threshold value may be set in advance or may be calculated by the processing unit 110 or the like. For example, the first threshold value may be a value such as a radius R1 of a circle about the center point WCP of the workpiece WK (target position) in the two-dimensional image, as shown in FIG. 10, which is described later.

Thus, when the difference between the position of the end point of the arm 320 and the target position is determined as equal to or greater than the first threshold value, the position of the end point of the arm 320 and the target position can be determined as sufficiently away from each other. In such a case, visual servoing or the like can be carried out based on the reference image with marker and mask and the picked-up image with marker and mask. When the position of the end point of the arm 320 and the target position are sufficiently away from each other, the position of each part of the robot is often greatly moved, often resulting in a large processing volume. Since visual servoing based on the reference image with marker and mask and the picked-up image with marker and mask is advantageous in that the processing volume can be restrained, as described above, restraining the processing load by performing such processing is effective.

Moreover, when the processing unit 110 determines that the difference between the position of the end point of the arm 320 of the robot 30 and the target position is equal to or greater than the first threshold value, the processing unit 110 may output a control signal for shifting the endpoint of the arm 320 to a predetermined position, to the robot control unit 120. The robot control unit 120 may control the robot 30 based on the control signal and shift the end point of the arm 320 of the robot 30 to the predetermined position. Furthermore, when the processing unit 110 determines that the robot 30 is situated at the predetermined position, the processing unit 110 may perform visual servoing based on the reference image with marker and mask and the picked-up image with marker and mask, generate a control signal and output the control signal to the robot control unit 120.

Here, the predetermined position refers to a position where the robot or each part of the robot can be shifted without performing visual servoing. For example, the predetermined position may be an initial position of the end point of the arm 320 of the robot 30 or may be a preset position other than the initial position.

Thus, when the difference between the position of the end point of the arm 320 of the robot 30 and the target position is determined as equal to or greater than the first threshold value, visual servoing or the like can be carried out based on the reference image with marker and mask and the picked-up image with marker and mask after the end point of the arm 320 of the robot 30 is shifted to the predetermined position.

According to this technique, since the robot 30 can be shifted to a predetermined position without performing visual servoing, the number of times of visual servoing being performed can be reduced in some cases. Therefore, the processing load on the robot control system can be restrained.

The storage unit 130 may also store, as the reference image, a reference image without mask in which no mask image is set, and a reference image with marker. When the processing unit 110 determines that the difference between the end point of the arm 320 of the robot 30 and the target position is equal to or smaller than a second threshold value, the processing unit 110 may perform visual servoing based on a picked-up image without mask that is a picked-up image in which no mask image is set and the reference image without mask, generate a control signal and output the control signal to the robot control unit 120.

Here, the reference image without mask refers to an image showing a target state of the robot 30, with no mask image set therein. For example, the reference image without mask is a reference image like RIM shown in FIG. 4A. Whether a marker is set or not does not matter to the reference image without mask. For example, a reference image with marker MKRIM of FIG. 8A, which is described later, is also a reference image without mask at the same time.

The picked-up image without mask refers to a picked-up image of the robot 30 by the image pickup unit 20, with no mask set therein. For example, the picked-up image without mask is a picked-up image like PIM shown in FIG. 4B. Whether a marker is set or not does not matter to the picked-up image without mask. For example, a picked-up image with marker MKPIM of FIG. 8B, which is described later, is also a picked-up image without mask at the same time.

Figure 12:
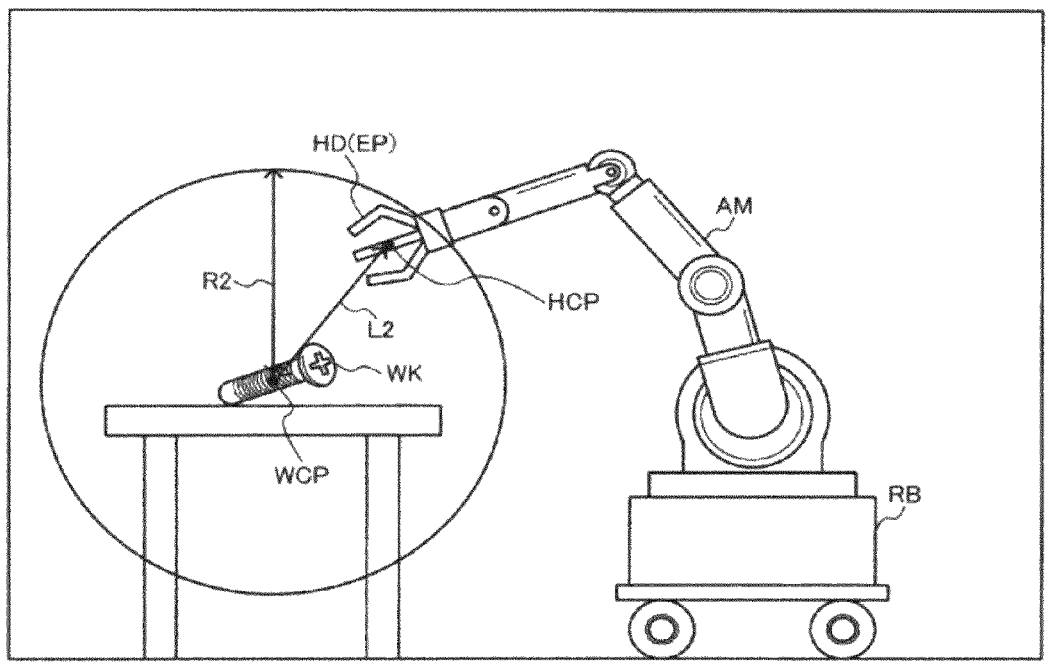
FIG. 12 is an explanatory view of visual servoing in a case where the end point of the arm is sufficiently close to the target position.

Moreover, the second threshold value is a value that serves as a reference for determining whether the position of the end point of the arm 320 and the target position are sufficiently close to each other or not. As the second threshold value, a reference value corresponding to the value used as the difference between the position of the end point of the arm 320 and the target position is set. The second threshold value may be set in advance or may be calculated by the processing unit 110 or the like. The second threshold value may be the same value as the first threshold value. For example, the second threshold value may be a value such as a radius R2 of a circle about a center point WCP of the workpiece WK (target position) in a two-dimensional image, as shown in FIG. 12, which is described later.

Thus, when the difference between the position of the end point of the arm 320 and the target position is determined as equal to or smaller than the second threshold value, the position of the end point of the arm 320 and the target position can be determined as sufficiently close to each other. In such a case, visual servoing or the like can be carried out based on the reference image without mask and the picked-up image without mask. When the position of the end point of the arm 320 and the target position are sufficiently close to each other, the position of each part of the robot is often finely tuned, often requiring highly accurate control. Since visual servoing based on the reference image without mask and the picked-up image without mask is advantageous in that detailed information of the size, shape and the like of the workpiece and the hand can be recognized amply and therefore highly accurate control can be performed, though a large processing volume is required. Therefore, such processing is effective.

When visual servoing is performed based on the reference image without mask and the picked-up image without mask, a control signal cannot be decided in some cases because of an extremely large processing load.

Thus, the storage unit 130 may store a mask image and a reference image without mask and may also store, as the reference image, a reference image with marker and mask. The processing unit 110 may perform visual servoing based on a picked-up image without mask and the reference image without mask. When a control signal cannot be decided, the processing unit 110 may generate a picked-up image with marker and mask, perform visual servoing based on the reference image with marker and mask and the picked-up image with marker and mask, generate control signal and output the control signal to the robot control unit 120.

Therefore, when visual servoing is performed based on the picked-up image without mask and the reference image without mask and a control signal cannot be decided, visual servoing or the like can be performed based on the picked-up image with marker and mask and the reference image with marker and mask. Thus, it is possible to avoid a situation where the robot 30 becomes uncontrollable because of the inability to decide a control signal, or the like.

The processing unit 110 may set a marker for at least one of the workpiece 40 and the hand 330 of the robot 30 by performing image shape recognition processing.

Figure 13A:
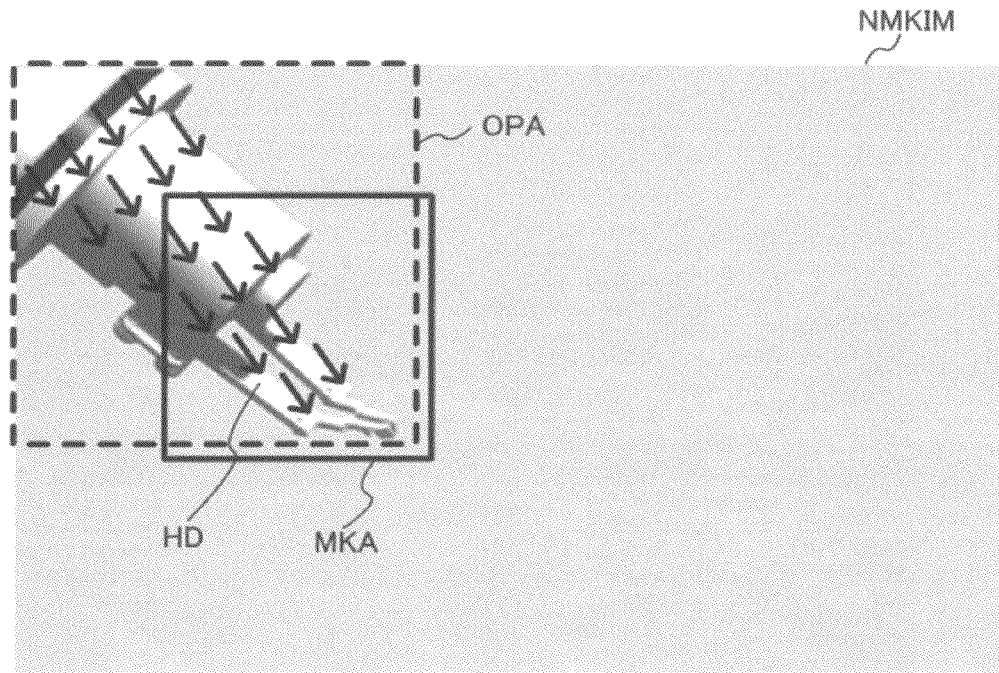
FIGS. 13A and 13B are explanatory views of a technique for setting markers by image shape recognition processing.

Here, image shape recognition processing refers to a technique used to recognize the shape of an object in an image, and for example, refers to optical flow analysis as shown in FIG. 13A, which is described later.

Thus, it is possible to set a marker or the like by performing image shape recognition processing to the area of at least one of the workpiece 40 and the hand 330 of the robot 30. When performing image shape recognition processing, no preparations are needed such as attaching a marker such as a seal to the hand or the like. Therefore, it is possible to set a marker or the like without involving the cost of preparation when setting the marker.

The storage unit 130 may also store reference image with marker in which a marker without rotational symmetry is set.

The processing unit 110 may generate a picked-up image with marker in which a marker without rotational symmetry is set, perform visual servoing based on the reference image with marker and the picked-up image with marker, generate a control signal and output the control signal to the robot control unit 120.

Thus, visual servoing or the like can be performed based on the reference image with marker and the picked-up image with marker in which a marker without rotational symmetry is set.

Here, a marker having rotational symmetry refers to a marker which coincides with an original marker when the marker is rotated by one turn on two-dimensional coordinates. Therefore, if a marker having rotational symmetry is to be used to determine the direction or the like of the hand of the robot and the workpiece on which the marker is set, plural markers need to be used to determine the direction or the like based on the positional relation of the plural markers.

Meanwhile, a marker without rotational symmetry refers to a marker which coincides with an original marker only on completion of one turn when the marker is rotated on two-dimensional coordinates. If a marker without rotational symmetry is to be used to determine the direction or the like of the hand of the robot and the workpiece on which the marker is set, it suffices to determine the direction of the one marker and there is no need to prepare plural markers.

Therefore, the number of markers to be set can be reduced and the cost of setting markers or the like can be reduced.

The robot control system or the like according to this embodiment may be realized by a program. In such a case, a processor such as a CPU executes the program, thus realizing the robot control system or the like according to this embodiment. Specifically, the program stored in an information storage medium is read out, and the processor such as a CPU executes the program that is read out. Here, the information storage medium (computer-readable medium) is for storing programs, data and the like. The functions of the information storage medium can be realized by an optical disc (DVD, CD or the like), HDD (hard disk drive), memory (card-type memory, ROM or the like) and so on. The processor such as a CPU performs various kinds of processing of this embodiment, based on the program (data) stored in the information storage medium. That is, in the information storage medium, a program for causing a computer (device having an operating unit, a processing unit, a storage unit and an output unit) to function as each unit described in this embodiment (program for causing a computer to execute processing in each unit) is stored.

2. Specific Examples

Hereinafter, specific examples of this embodiment will be described with reference to FIGS. 8A to 14C.

Figure 8A:
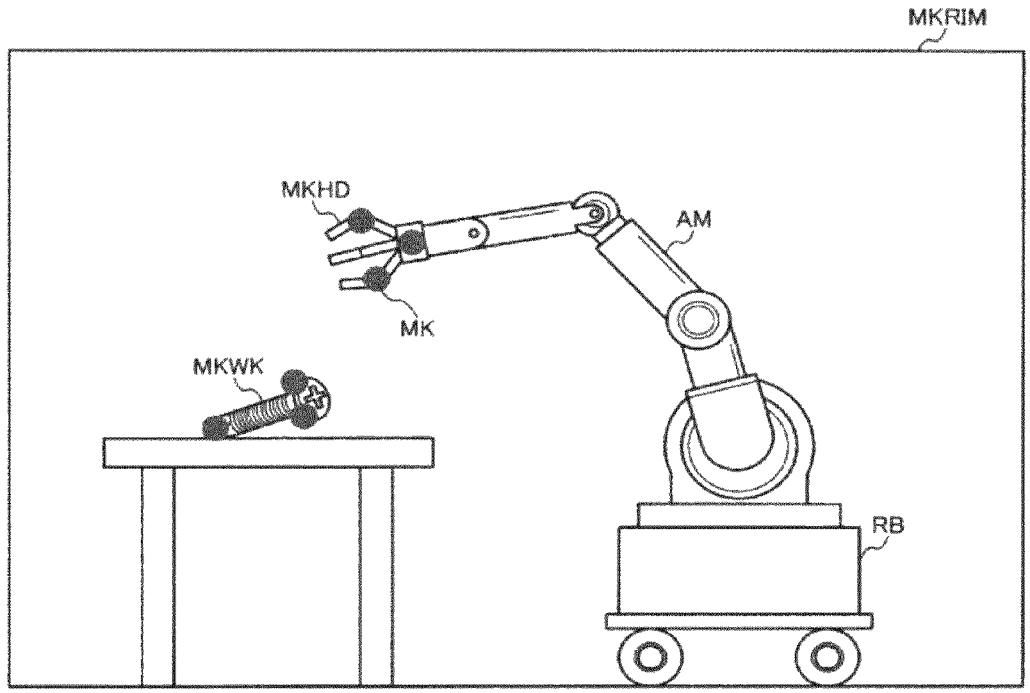
FIGS. 8A and 8B are explanatory views of visual servoing using markers.
Figure 8B:
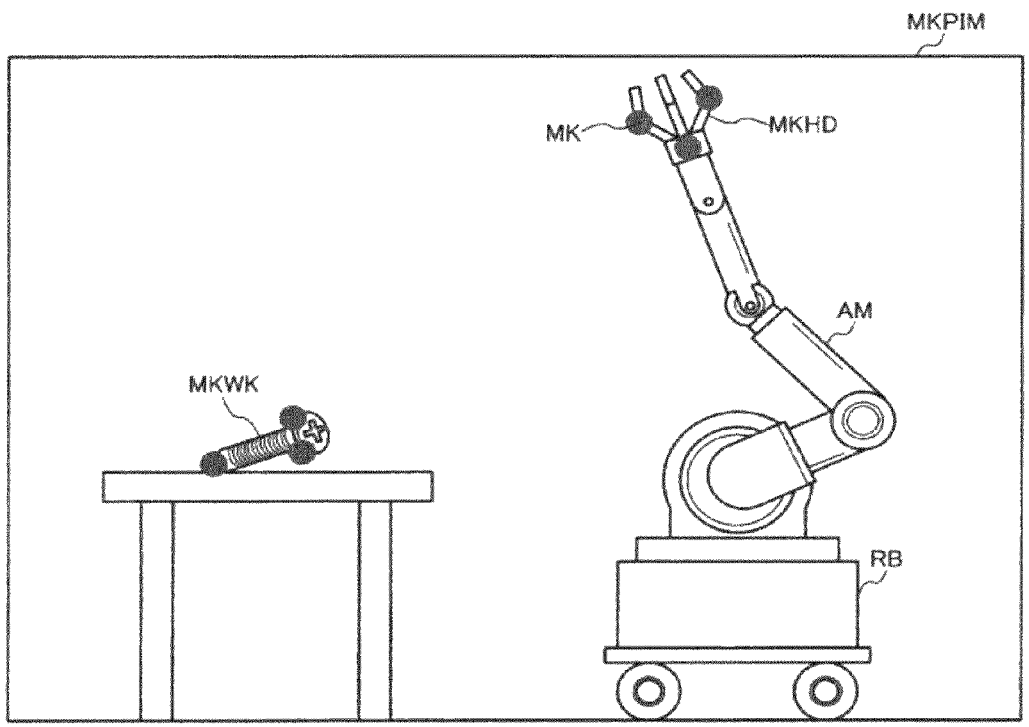

First, a technique of visual servoing based on a reference image with marker and a picked-up image with marker will be described with reference to FIGS. 8A and 8B. FIG. 8A shows a reference image with marker MKRIM. FIG. 8B shows a picked-up image with marker MKPIM.

The reference image with marker MKRIM is prepared in advance. In this case, after the robot RB and each part of the robot RB are arranged at expected positions, an image of the work space is picked up by the image pickup unit, thus generating an image. Then, a marker image MK is superimposed on the areas of the workpiece and the hand appearing in the generated image and a workpiece MKWK and a hand MKHD are shown. Thus, the reference image with marker MKRIM is generated.

Meanwhile, the picked-up image with marker MKPIM is generated by superimposing a marker image MK on an image picked up by the image pickup unit when visual servoing is performed actually. The technique used for superimposing the marker image MK is similar to the case of the reference image with marker MKRIM.

In this example, the hand MKHD in the reference image with marker MKRIM and the hand MKHD in the picked-up image with marker MKPIM are different in position. Therefore, a control signal for bringing the hand MKHD in the picked-up image with marker MKPIM closer to the position of the hand MKHD in the reference image with marker MKRIM is calculated based on homography or the like.

Figure 9A:
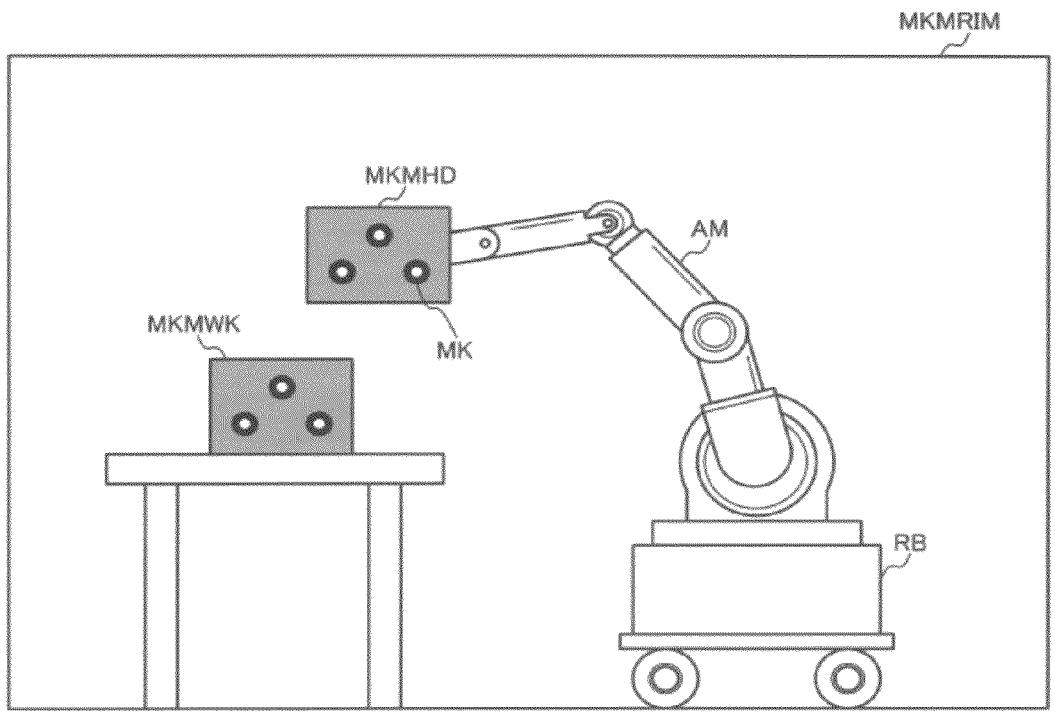
FIGS. 9A and 9B are explanatory views of visual servoing using an image in which markers are set on mask images.
Figure 9B:
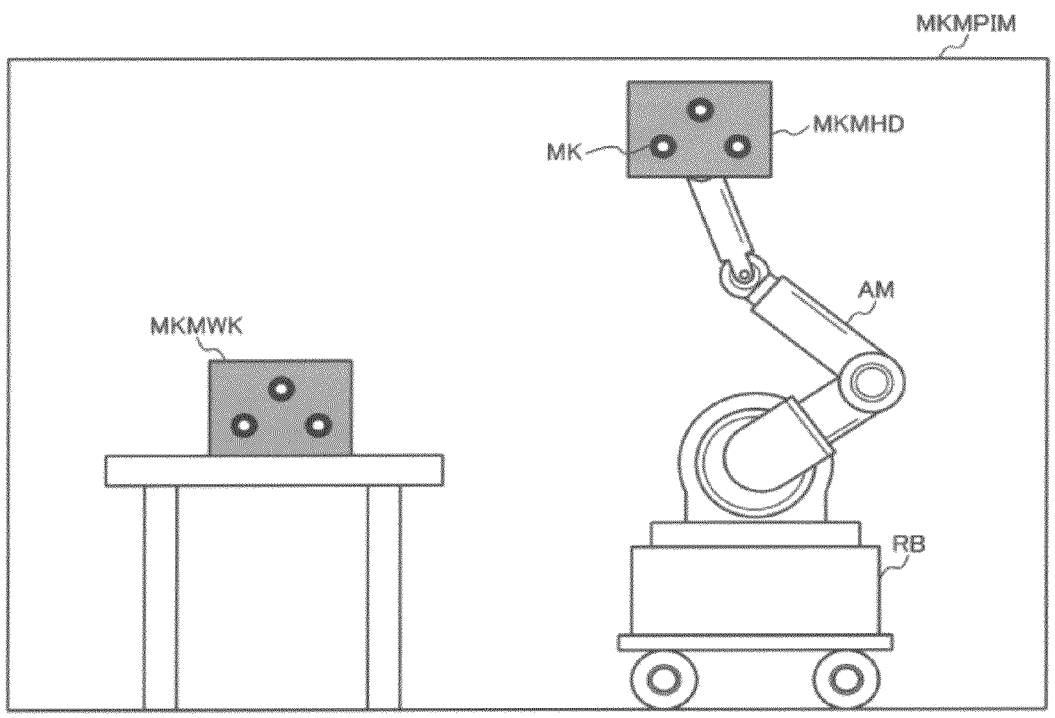

Next, a technique of visual servoing based on the a reference image with marker and mask and a picked-up image with marker and mask will be described with reference to FIGS. 9A and 9B. FIG. 9A shows a reference image with marker and mask MKMRIM. FIG. 9B shows a picked-up image with marker and mask MKMPIM.

The reference image with marker and mask MKMRIM is prepared in advance, for example. In this case, after the robot RB and each part of the robot RB are arranged at expected positions, an image of the work space is picked up by the image pickup unit, thus generating an image. Then, a mask image is superimposed on the areas of the workpiece and the hand appearing in the generated image, and a marker image MK is further superimposed on the mask image to show a workpiece MKMWK and a hand MKMHD. Thus, the reference image with marker MKMRIM is generated.

Meanwhile, the picked-up image with marker and mask MKMPIM is generated by superimposing a mask image on an image picked up by the image pickup unit when visual servoing is performed actually, and further superimposing a marker image MK on the mask image. The technique used for superimposing the mask image and marker image MK is similar to the case of the reference image with marker MKRIM.

The flow of the subsequent processing is similar to FIGS. 8A and 8B.

Next, visual servoing in a case where the end point of the arm and the target position are sufficiently away from each other will be described with reference to FIG. 10. FIG. 10 shows a case where the center point WCP of the workpiece WK coincides with the target position.

In this example, when the distance L1 between the center point WCP (target position) of the workpiece WK appearing in the picked-up image and the center point HCP of the hand HD is equal to or greater than the radius R1 of the circle about WCP on a two-dimensional picked-up image, the end point of the arm is determined as sufficiently away from the target position. When L1 is smaller than R1, the end point of the arm is determined as not sufficiently away from the target position.

In the case of FIG. 10, since L1 is equal to or greater than R1, the endpoint of the arm is determined as sufficiently away from the target position. A mask image is set for the workpiece WK and the hand HD and a marker image is set further on the mask image, thus generating a picked-up image with marker and mask. Then, visual servoing is performed using a reference image with marker and mask and the picked-up image with marker and mask.

Next, a technique of visual servoing after the robot is shifted to a predetermined position will be described with reference to FIGS. 11A and 11B.

Figure 11A:
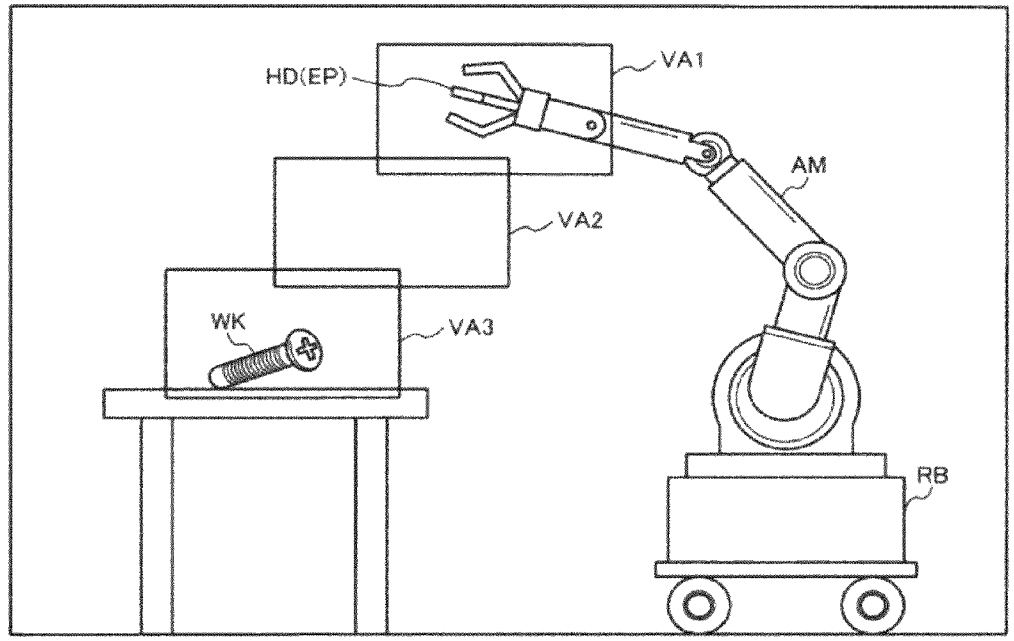
FIGS. 11A and 11B are explanatory views of a technique for performing visual servoing after the robot is shifted to a predetermined position.

First, FIG. 11A shows a technique of shifting the robot RB and each part of the robot RB to the target position by performing visual servoing plural times. In this case, a range that can be covered by a first image pickup unit is defined as VA1, a range that can be covered by a second image pickup unit is defined as VA2, and a range that can be covered by a third image pickup unit is defined as VA3. In this example, since the hand HD of the robot RB appears in VA1, the first visual servoing is performed in VA1 and the hand HD is shifted to a target position in VA1. Next, visual servoing is performed sequentially in VA2 and VA3, and the hand HD is shifted to a target position in VA2 and then to a target position in VA3, which is the final target position.

In the case of FIG. 11A, the hand HD cannot be shifted directly to the final target position by the first visual servoing and therefore visual servoing with a large processing load must be repeated plural times. Also, in VA1 and VA2, the robot RB and each part of the robot RB need not be shifted strictly to the target position and it suffices to shift the robot RB and each part of the robot RB accurately to the target position in VA3, which is the final target position. Moreover, as long as visual servoing can be carried out within VA3, the robot RB and each part of the robot RB can be shifted to the final target position from any position in VA3.

Thus, a technique of performing visual servoing after shifting the robot RB and each part of the robot RB to a predetermined position that is closer to the target position than the present position of the robot RB and each part of the robot RB is, can be considered. For example, in the example of FIG. 11A, when the robot RB and each part of the robot RB are shifted to a predetermined position in VA2, performing visual servoing twice enables the robot RB and each part of the robot RB to reach the final target position. When the robot RB and each part of the robot RB are shifted to a predetermined position in VA3, performing visual servoing once enables the robot RB and each part of the robot RB to reach the final target position.

Figure 11B:
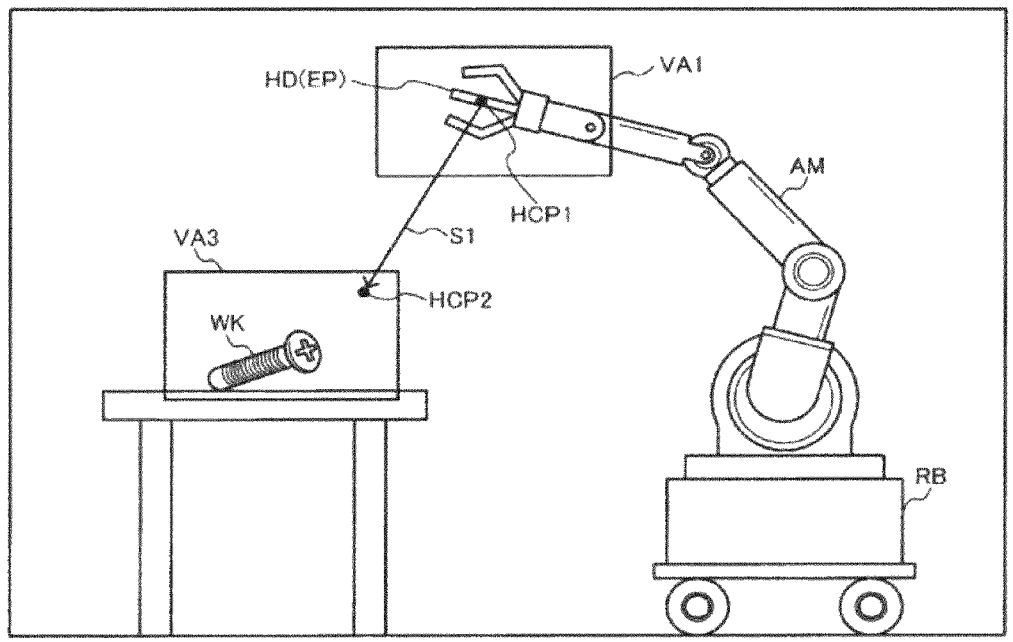

FIG. 11B shows a case where visual servoing is performed after a center point HCP1 of the hand HD is shifted to HCP2 in VA3, along a trajectory as indicated by S1. In this example, since the predetermined position HCP2 is the center point of the hand HD when the robot RB is in the initial attitude, the position of the hand HD can be changed without performing visual servoing. This technique is not limited to the case where the initial attitude is used, and can also be executed when a preset attitude or position is determined as closer to the target position than the present position of the robot RB and each part of the robot RB is. Using the above technique, the above advantages can be achieved and the processing load on the robot control system can be restrained.

Next, visual servoing in a case where the end point of the arm is sufficiently close to the target position will be described with reference to FIG. 12. FIG. 12 shows a case where the target position coincides with the center point WCP of the workpiece WK.

In this example, when the distance L2 between the center point WCP of the workpiece WK (target position) and the center point HCP of the hand HD is equal to or smaller than the radius R2 of the circle about WCP on a two-dimensional picked-up image, the end point of the arm is determined as sufficiently close to the target position. When L2 is greater than R2, the end point of the arm is determined as not sufficiently close to the target position.

In the case of FIG. 12, since L2 is equal to or smaller than R2, the endpoint of the arm is determined as sufficiently close to the target position and visual servoing is performed using a reference image without mask and a picked-up image without mask.

However, in this case, when a control signal cannot be decided based on visual servoing because of an excessively large processing load on the robot control system, a mask image is set for the workpiece WK and the hand HD and a marker image is set on the mask image, thus generating a picked-up image with marker and mask. Then, visual servoing is performed using a reference image with marker and mask and the picked-up image with marker and mask.

Figure 13B:
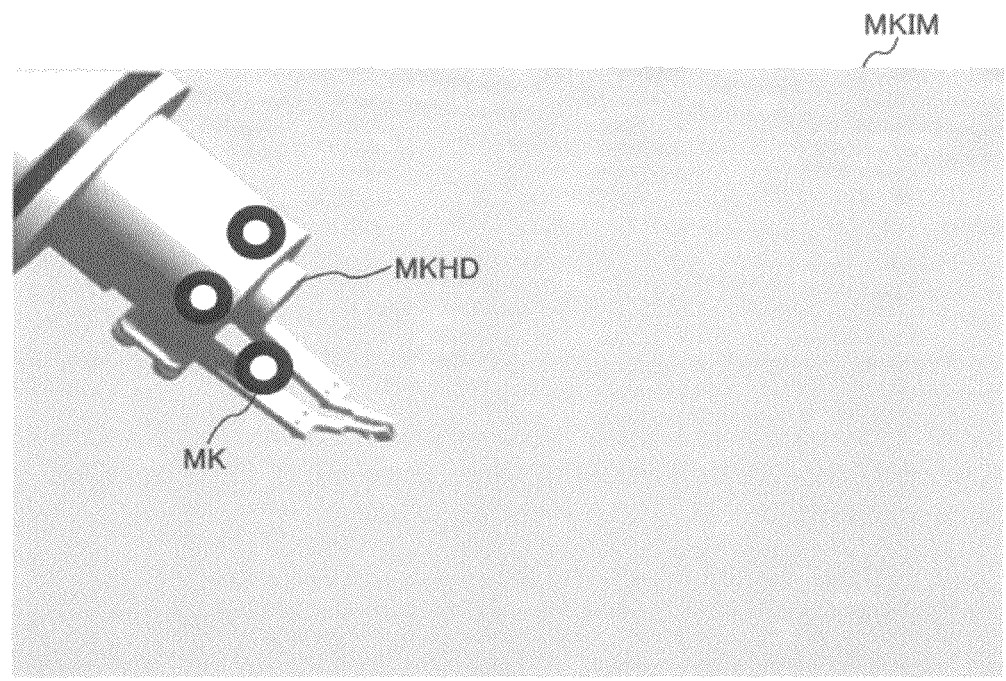

Next, a technique of setting a marker image by image shape recognition processing will be described with reference to FIGS. 13A and 13B. FIG. 13A shows an image NMKIM in which no marker image is set. FIG. 13B shows an image MKIM in which a marker image is set.

In FIG. 13A, an optical flow in the case where an optical flow analysis is carried out when picking up an image of the work space is indicated by arrows. An area OPA including the distal end of a moving body detected by the optical flow analysis is specified and the hand HD is regarded as included in OPA. Then, a predetermined area in OPA existing in a direction in which the moving body travels is specified as a marker setting area MKA.

A marker image is superimposed on the specified marker setting area MKA, thus generating an image with marker MKIM. An arbitrary technique can be used for arranging the marker image in the marker setting area MKA. However, it is desirable that the marker image is arranged in such a way that the direction of the hand and the workpiece can be determined based on the arrangement of the marker. For example, when three markers are used, arranging the markers in such a way that the three markers form a right-angled triangle when the markers are connected by straight lines, or the like can be considered.

Finally, a technique of visual servoing using a marker without rotational symmetry will be described with reference to FIGS. 14A to 14C.

Figure 14A:
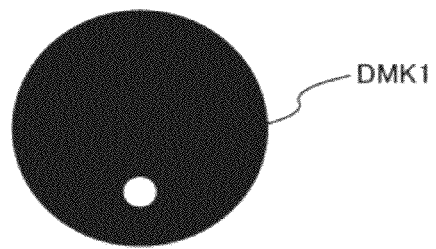
FIGS. 14A to 14C are explanatory views of a marker without rotational symmetry.
Figure 14B:
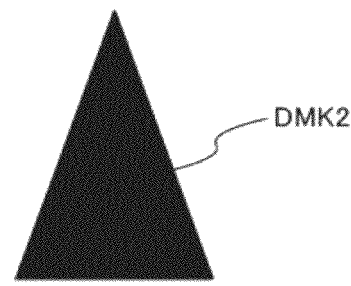
Figure 14C:
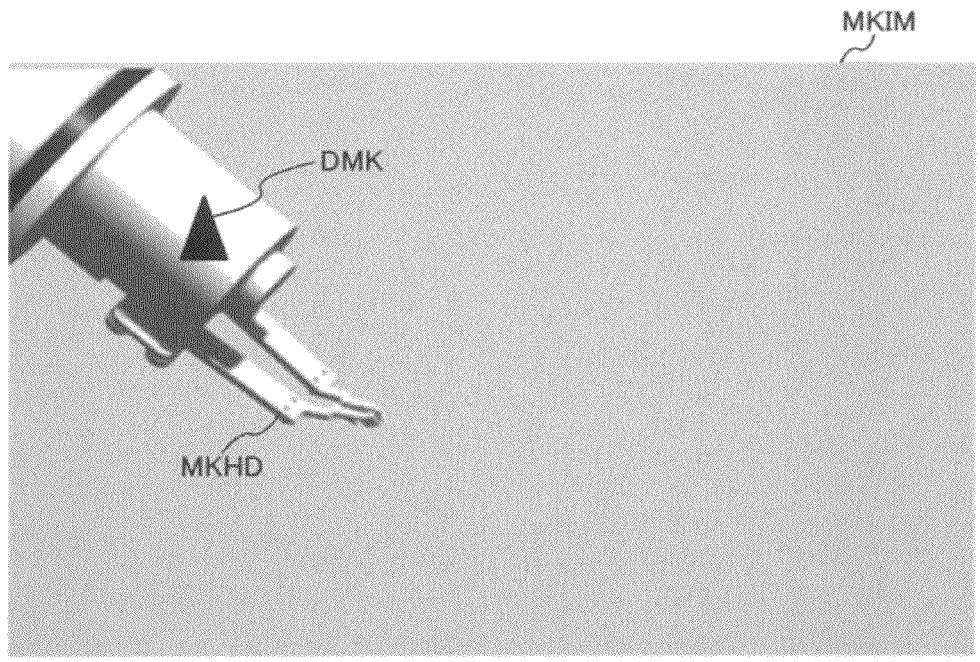

FIGS. 14A and 14B show a marker DMK1 and a marker DMK2 as examples of the marker without rotational symmetry. FIG. 14C shows an image with marker MKIM in which a marker DMK without rotational symmetry is set on the hand, showing a hand MKHD.

The subsequent flow of processing in the case of visual servoing using the marker without rotational symmetry is similar to the above-described technique.

3. Details of Processing

Figure 15:
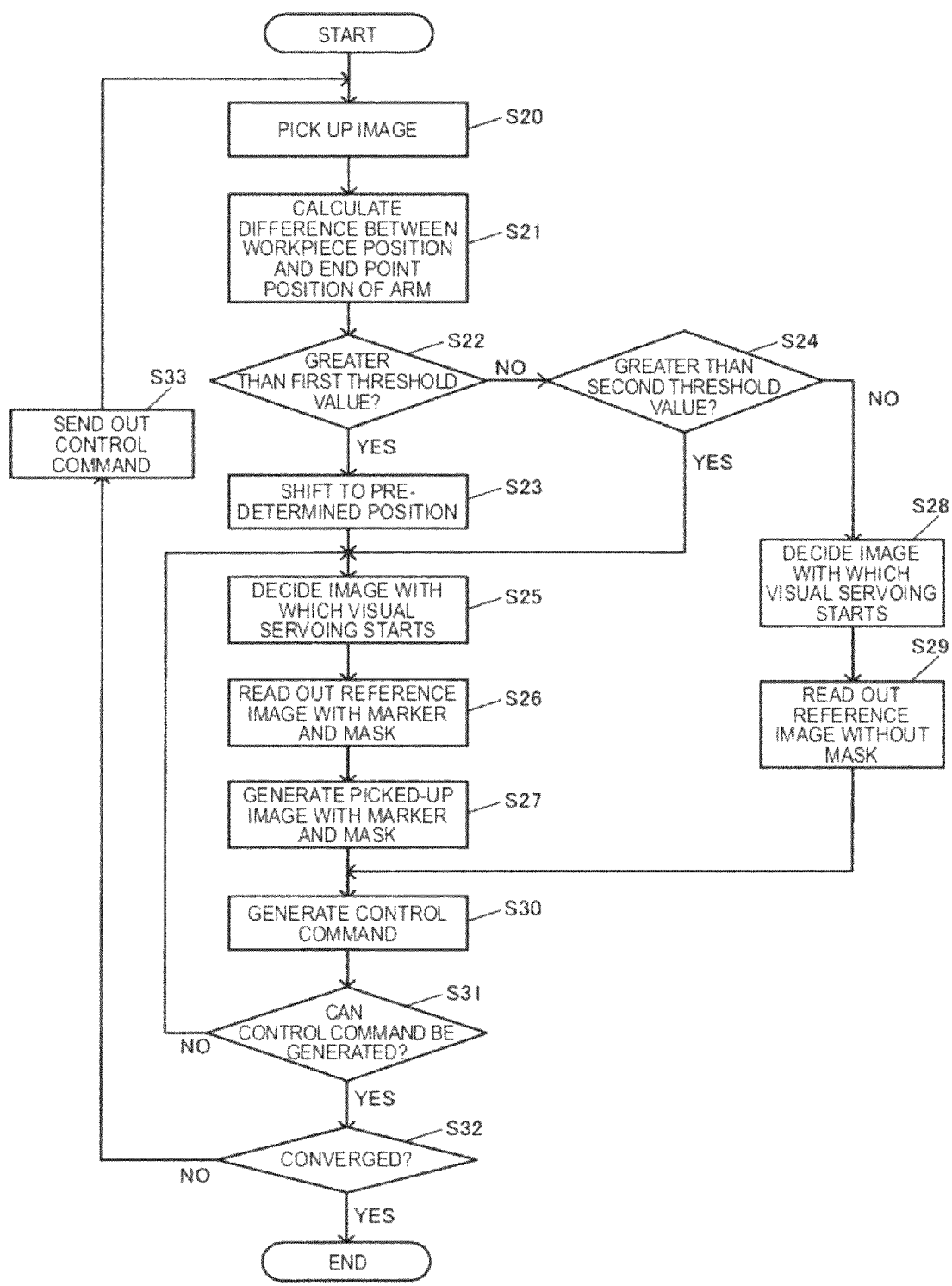
FIG. 15 is a flowchart of visual servoing using an image in which markers are set on a mask image.

Hereinafter, an example of details of the processing according to this embodiment will be described with reference to the flowchart of FIG. 15.

First, the image pickup unit 20 picks up an image of the workspace and generates a picked-up image (S20). Next, the processing unit 110 estimates a linear distance in a three-dimensional space that is the difference between the position of the workpiece 40 and the position of the end point (which may be the hand 330) of the arm 320, based on the picked-up image (S21).

Then, the processing unit 110 determines whether the estimated distance is greater than a first threshold value (S22). When the estimated distance is determined as greater than the first threshold value, the processing unit 110 outputs, to the robot control unit 120, a control signal for shifting the robot 30 or each part of the robot 30 to a predetermined position, and the robot control unit 120 controls the robot 30 according to the control signal (S23).

Meanwhile, when the processing unit 110 determines that the estimated distance is equal to or smaller than the first threshold value, the processing unit 110 compares a second threshold value with the estimated distance (S24).

When the processing unit 110 determines that the estimated distance is greater than the second threshold value, or after the processing of S23, the processing unit 110 decides to start visual servoing based on the picked-up image taken by the image pickup unit 20 which shows the end point of the arm 320 of the robot 30, of plural image pickup units (S25). Then, the processing unit 110 reads out, from the storage unit 130, a reference image with marker and mask corresponding to the picked-up image with which visual servoing is to start (S26). Moreover, the processing unit 110 reads out a marker and a mask image form the storage unit 130, superimposes the mask image on the acquired picked-up image, and further superimposes the marker thereon, thus generating a picked-up image with marker and mask (S27).

Meanwhile, when the processing unit 110 determines that the estimated distance is equal to or smaller than the second threshold value, the processing unit 110 decides to start visual servoing based on the picked-up image taken by the image pickup unit 20 which shows the end point of the arm 320 of the robot 30, of the plural image pickup units (S28). Then, the processing unit 110 reads out, from the storage unit 130, a reference image without mask corresponding to the picked-up image with which visual servoing is to start (S29). The picked-up image acquired by the image pickup unit 20 is used as a picked-up image without mask.

After the reference image with marker and mask is read, the processing unit 110 generates a control command for the robot 30 based on the picked-up image with marker and mask and the reference image with marker and mask (S30). However, after the reference image without mask is read, the processing unit 110 generates a control command for the robot 30 based on the picked-up image without mask and the reference image without mask (S30). The control command generation processing is similar to the above-described position-based visual servoing. For example, a control command is generated by using homography or the like.

At this point, whether a control command can be generated or not is determined (S31). When a control command cannot be generated, the processing shifts to S25. Meanwhile, when a control command can be generated, whether the control quantity is converged to a target value or not is determined based on the generated control command (S32). When the control quantity is determined as converged to the target value, visual servoing ends. However, when the control quantity is determined as not converged to the target value, the processing unit 110 sends out the control command to the robot control unit 120 (S33). Then, the processing shifts to S20. The flow up to this point is repeated until the control quantity converges.

The embodiment is described above in detail. However, those skilled in the art can readily understand that various modifications can be made without substantially departing from the novel features and advantages of the invention. Therefore, all such modifications should be regarded as included in the scope of the invention. For example, a term described together with a different term with a broader meaning or the same meaning at least once in the specification or drawings can be replaced with that different term at any point in the specification or drawings. The configurations and operations of the robot control system, the robot system and the program are not limited to those described in the embodiment and various modified embodiments are possible.

The entire disclosure of Japanese Patent Application Nos. 2011-109079, filed May 16, 2011 and 2011-266540, filed Dec. 6, 2011 are expressly incorporated by reference herein.

What is claimed is:

1. A robot control system comprising:
   a processor which performs visual servoing based on a reference image representing a target position of a robot and a picked-up image of the robot picked up by an image pickup member;
   a robot contoller which controls the robot based on a control signal for the robot outputted from the processor; and
   a storage which stores information of the reference image and a marker for the visual servoing,
   wherein
   the storage stores a marker reference image, which has the marker, as the reference image, and the marker is provided at a hand of the robot, and
   the processor generates a marker picked-up image, which has the marker, based on the picked-up image in which the hand with the marker is present, performs the visual servoing based on the marker reference image and the marker picked-up image, generates the control signal, and outputs the control signal to the robot controller.

2. The robot control system according to claim 1, wherein
   the storage stores a mask image and stores a mask marker reference image, which has the mask image and the marker, as the reference image, and the mask image is provide at the hand of the robot, and
   the processor generates a mask marker picked-up image, which has the mask image and the marker, based on the picked-up image in which the hand with the mask image and the marker is present, performs the visual servoing based on the mask marker reference image and the mask marker picked-up image, generates the control signal, and outputs the control signal to the robot controller.

3. The robot control system according to claim 2, wherein
   when the processor determines that a difference between the target position and an end point position of an arm of the robot is equal to or more than a first threshold value, the processor performs the visual servoing based on the mask marker reference image and the mask marker picked-up image, generates the control signal, and outputs the control signal to the robot controller.

4. The robot control system according to claim 3, wherein
   when the processor determines that the difference is equal to or more than the first threshold value, the processor outputs a move control signal for moving the arm to a predetermined position,
   the robot controller controls the robot based on the move control signal and moves the arm of the robot to the predetermined position, and
   when the processor determines that the arm of the robot is in the predetermined position, the processor performs the visual servoing based on the mask marker reference image and the mask marker picked-up image, generates the control signal, and outputs the control signal to the robot controller.

5. The robot control system according to claim 1, wherein
   the storage stores a non-mask reference image, which does not include the mask image, as the reference image, and
   when the processor determines that a difference between the target position and an end point of an arm of the robot is equal to or less than a second threshold value, the processor generates a non-mask picked-up image, which does not include the mask image, based on the picked-up image in which the hand is present, performs the visual servoing based on the non-mask picked-up image and the non-mask reference image, generates the control signal, and outputs the control signal to the robot controller.

6. The robot control system according to claim 1, wherein
   the storage stores a mask image, a non-mask reference image, which does not include the mask image, and a mask marker reference image, which has the mask image and the marker, as the reference image, and the mask image is provided at the hand of the robot, and
   when the processor does not generate the control signal by generating a non-mask picked-up image, which does not include the mask image, based on the picked-up image in which the hand is present and by performing the visual servoing based on the non-mask picked-up image and the non-mask reference image, the processor generates a mask marker picked-up image, which has the mask image and the marker, based on the picked-up image in which the hand with the mask image and the marker is present, performs the visual servoing based on the mask marker reference image and the mask marker picked-up image, generates the control signal, and outputs the control signal to the robot controller.

7. The robot control system according to claim 1, wherein
   the processor sets the marker by carrying an out image shape recognition processing to the hand of the robot.

8. The robot control system according to claim 1, wherein
   the storage stores the marker reference image in which the marker does not have rotational symmetry, and
   the processor generates the marker picked-up image in which the marker does not have rotational symmetry, performs the visual servoing based on the marker reference image and the marker picked-up image, generates the control signal, and outputs the control signal to the robot controller.

9. A robot comprising the robot control system according to claim 1.

10. A robot comprising the robot control system according to claim 2.

11. A robot comprising the robot control system according to claim 3.

12. A robot comprising the robot control system according to claim 4.

13. A robot comprising the robot control system according to claim 5.

14. A robot comprising the robot control system according to claim 6.

15. A robot comprising the robot control system according to claim 7.

16. A robot comprising the robot control system according to claim 8.

17. A computer program product embodying computer readable instructions stored on a non-transitory computer readable medium for causing execution in a computer, the computer program product comprising:
   instructions for preforming visual servoing based on a reference image representing a target position of a robot and a picked-up image of the robot picked up by an image pickup member;
   instructions for controlling the robot based on a control signal for the robot;
   instructions for storing information of the reference image and a marker for the visual servoing;
   instructions for storing a marker reference image, which has the marker, as the reference image, and the marker is provided at a hand of the robot;

instructions for generating a marker picked-up image, which has the marker, based on the picked-up image in which the hand with the marker is present;
instructions for performing the visual servoing based on the marker reference image and the marker picked-up image; and
instructions for generating the control signal for controlling the robot.

* * * * *